(12) United States Patent
Takasugi et al.

(10) Patent No.: US 8,427,789 B2
(45) Date of Patent: Apr. 23, 2013

(54) MAGNETIC HEAD SUSPENSIONS HAVING A LOAD BENDING PORTION, A LOAD BEAM PORTION, AND A BALANCE MASS MEMBER

(75) Inventors: Satoru Takasugi, Kyoto-fu (JP); Yasuo Fujimoto, Kyoto-fu (JP); Kenji Mashimo, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 0 days.

(21) Appl. No.: 13/469,187

(22) Filed: May 11, 2012

(65) Prior Publication Data

US 2012/0218665 A1    Aug. 30, 2012

Related U.S. Application Data

(62) Division of application No. 12/028,671, filed on Feb. 8, 2008, now Pat. No. 8,203,807.

(30) Foreign Application Priority Data

Feb. 9, 2007  (JP) .................................. 2007-030369
Jul. 17, 2007  (JP) .................................. 2007-185411

(51) Int. Cl.
  *G11B 5/55*    (2006.01)
  *G11B 21/08*    (2006.01)
(52) U.S. Cl.
  USPC ....................................................... 360/265.9

(58) Field of Classification Search ............... 360/265.9, 360/266, 244.5, 244.8, 245.2
See application file for complete search history.

(56) References Cited

FOREIGN PATENT DOCUMENTS

| JP | 62-162288 | 7/1987 |
|---|---|---|
| JP | 9-82052 | 3/1997 |
| JP | 11-39808 | 2/1999 |
| JP | 2002-208244 | 7/2002 |
| JP | 2004-348804 | 12/2004 |
| JP | 2005-174506 | 6/2005 |

OTHER PUBLICATIONS

The Notification of Reasons for Rejection for related Japanese Appl. No. 2007-185411, (with English translation) Japanese Patent Office, mailed Apr. 3, 2009, 4 pgs.

*Primary Examiner* — Joseph Haley
*Assistant Examiner* — Gustavo Polo
(74) *Attorney, Agent, or Firm* — Sterne, Kessler, Goldstein & Fox P.L.L.C.

(57) ABSTRACT

The present invention provides a magnetic head suspension, wherein a supporting portion such as an arm or base plate includes a pair of supporting pieces extending from its opposite sides in the widthwise direction to a tip-end side of the suspension, and a concave portion which is defined by the pair of supporting pieces and is opened toward the tip-end side of the suspension, there is provided an elastically-deformable elastic plate which is connected to the pair of supporting pieces at a first end and a second end in the widthwise direction of the magnetic head suspension, the member forming the load beam portion is connected to the elastic plate, and the elastic plate forms the load bending portion.

10 Claims, 35 Drawing Sheets

(a)

(b)

(a)

(b)

(a)

(b)

(c)

(a)

(b)

(c)

(d)

(a)

(b)

(a)

(b)

(c)

(a)

(b)

(a)

(b)

(c)

(a)

(b)

(a)

(b)

(c)

(a)

(b)

MAGNETIC HEAD SUSPENSIONS HAVING A LOAD BENDING PORTION, A LOAD BEAM PORTION, AND A BALANCE MASS MEMBER

CROSS-REFERENCE TO RELATED APPLICATION

This application is a divisional application of U.S. patent application Ser. No. 12/028,671, filed Feb. 8, 2008, the disclosure of which is incorporated herein in its entirety be reference thereto.

BACKGROUND OF THE INVENTION

1. Field of the Invention

The present invention relates to a suspension for supporting a magnetic head slider for reading and/or writing data from and/to a recording medium such as a hard disc device.

2. Related Art

In recent years, data storage devices for reading and/or writing data from and/to recording mediums through a magnetic head slider have been widely used in mobile apparatuses such as notebook-type personal computers and portable music players and, along therewith, these data storage devices have been required to have high impact resistance.

More specifically, when such a data storage device is subjected to an external impulsive force with an acceleration equal to or greater than a certain value in such a direction that the magnetic head slider is separated from a disk surface, the magnetic head slider jumps in such a direction that it separates from the disk surface and, then, swings back from the jump to the disc surface and impinges on the disk surface, thereby damaging the disk surface. Accordingly, in order to increase the impact resistance of the data storage device, there is a need for raising the value of the acceleration (the critical acceleration) of an external impulsive force which triggers jump of the magnetic head slider.

For example, by increasing the load which presses the magnetic head slider against the disk surface, it is possible to raise the critical acceleration.

However, it is necessary to set the load to within a proper range, in order to control the height of the magnetic head slider above the disk surface. Accordingly, there is naturally a limit to the method which increases the load for suppressing the jump of the magnetic head slider.

As another structure for suppressing the jump of the magnetic head slider, there is also known a structure in which the mass of a load beam portion is reduced for reducing the inertial force applied to the load beam portion when an impulsive force is applied thereto, thus raising the critical acceleration.

However, when the thickness of the load beam portion is reduced and/or a hole is formed in the load beam portion in order to reduce the mass of the load beam portion, this will reduce the rigidity of the load beam portion, thus inducing the problem of degradation of the vibration characteristics and the loading/unloading characteristics.

As still another structure for suppressing the jump of the magnetic head slider, there has been proposed a structure in which the load beam portion supported through a load bending portion by a supporting portion such as an arm or a base plate is formed to have an extending portion extending toward the base-end side of the suspension (for example, JP-A. No. 9-082052, JP-A. No. 11-039808, JP-A. No. 2004-348804, and JP-A. No. 2005-174506).

The conventional structure is configured so as to makes the mass of the portion of the load beam portion which is closer to the base-end side of the suspension than the load bending portion to be as equal as possible to the mass of the portion thereof which is closer to the tip-end side of the suspension than the load bending portion. The structure is advantageous in suppressing the jump of the magnetic head slider at a time when being subjected to an external impulsive forced without degrading the rigidity of the load beam portion.

However, in the magnetic head suspensions described in these patent documents, the load beam portion is connected to the free end portion of the load bending portion which is supported by the supporting portion in a cantilever manner. With these structures, the supporting point of the load beam portion (namely, the portion of the load beam portion which is connected to the load bending portion) may vary in the direction orthogonal to the disk surface when an impulsive force is applied thereto.

Accordingly, the magnetic head suspensions described in these patent documents can not sufficiently raise the critical acceleration, although the problem of degradation of the rigidity of the load beam portion does not occur.

SUMMARY OF THE INVENTION

The present invention is made in view of the conventional techniques and aims to provide a magnetic head suspension capable of preventing, as much as possible, the supporting point of a load beam portion from varying in the direction orthogonal to a disk surface when an impact is applied thereto, thus effectively raising the critical acceleration of the impact which trigger the jump action of the magnetic head slider.

The present invention provide, in order to achieve the aim, a magnetic head suspension including a load bending portion generating a load for pressing a magnetic head slider toward a disk surface, a load beam portion transmitting the load to the magnetic head slider, a supporting portion supporting the load beam portion through the load bending portion, and a flexure portion connected to the load beam portion and supporting the magnetic head slider, wherein the supporting portion includes a pair of supporting pieces extending from its opposite sides in the widthwise direction to a tip-end side of the suspension, and a concave portion which is defined by the pair of supporting pieces and is opened toward the tip-end side of the suspension, there is provided an elastically-deformable elastic plate which is connected to the pair of supporting pieces at a first end and a second end in the widthwise direction of the magnetic head suspension, the member forming the load beam portion is connected to the elastic plate, and the elastic plate forms the load bending portion.

According to the present invention, since the elastic plate, which is supported at its first and second ends along the widthwise direction of the suspension by the supporting portion in a dual-supported manner, functions as the load bending portion, it is possible to effectively prevent the supporting point of the load beam portion (the point of the load beam portion which is connected to the load bending portion) from varying in the direction orthogonal to the disk surface when the external impulsive force is applied thereto, thereby largely raising the critical acceleration of the impulsive force which triggers the jump of the magnetic head slider.

In one embodiment, the elastic plate is twisted such that a tip end of a center area positioned between the first and second ends comes close to the disk surface in a state where the first and second ends are respectively connected to the pair of supporting pieces to be bound.

In another embodiment, the pair of supporting pieces are bended at bended positions between their base ends and tip ends in such a manner that their tip ends come close to the disk surface. The elastic plate is connected to the pair of supporting pieces at portions closer to the tip ends than the bended positions.

Preferably, the elastic plate includes first and second connected areas which are respectively connected to the pair of supporting pieces, and a center area extending between the first and second connected areas.

The center area includes a center connected portion to which a member forming the load beam portion is connected, a first extending portion extending between the center connected portion and the first connected area, and a second extending portion extending between the center connected portion and the second connected area, the second extending portion being symmetrical with respect to the first extending portion with a longitudinal center line of the magnetic head suspension as a reference.

More preferably, the center connected portion has a width greater than those of the first and second extending portions.

More preferably, the center connected portion is extended toward both a tip-end side and a base-end side of the suspension with the first and second extending portions as a reference.

Each of the first and second extending portions preferably has, at both a tip-end side and a base-end side, outer curved portions having a width gradually increased with decreasing distance to the corresponding connected area, and inner curved portions having a width gradually increased with decreasing distance to the center connected portion.

The configuration makes it possible to stabilize the twist action of the first and second extending portions.

The center connected portion of the elastic plate integrally includes a tip-end-side flat-surface portion which is positioned on a tip-end side of the suspension and which is connected to a member forming the load beam portion at an attitude parallel to the member forming the load beam portion, a center flat-surface portion which is extended from the tip-end-side flat-surface portion toward the base-end side of the suspension and which is inclined with respect to the tip-end-side flat-surface portion such that it gradually separates from the member forming the load beam portion with increasing distance from the tip-end side toward the base-end side and to which the first and second extending portions are connected, and a base-end-side flat-surface portion which is extended toward the base-end side of the suspension from the center flat-surface portion through a bending portion and which is connected to the member forming the load beam portion. The center flat-surface portion is positioned within the same plane as the plane in which there exist the first and second extending portions and the first and second connected areas in a state before the magnetic head suspension is mounted to a data storage device, and the first and second extending portions are twisted to generate the load in a state where the magnetic head suspension is operated after being mounted to the data storage device.

The configuration makes it possible to obtain the load in a state where the suspension is operated after being mounted to the data storage device, without performing a twisting process on the first and second extending portions before the suspension is mounted to the data storage device.

In the above various configurations, the suspension preferably further includes a restraint plate connected to the supporting portion so as to be positioned on a side of a member forming the load beam portion opposite from the elastic plate in a direction orthogonal to the disk surface with the member forming the load beam portion sandwiched between the restraint plate and the elastic plate. The restraint plate has a single or plurality of protrusion portion which contacts with the member forming the load beam portion on a load bending center line of the first and second extending portions along the widthwise direction of the suspension. The single or plurality of protrusion portion is placed to be symmetrical with the longitudinal center line as a reference.

The configuration makes it possible to more effectively prevent the supporting point of the load beam portion from varying, thereby more largely raising the critical acceleration of the impulsive force which triggers the jump of the magnetic head slider.

For example, the restraint plate may have the single protrusion portion. The single protrusion portion is contacted with the member forming the load beam portion over a predetermined distance in the widthwise direction of the magnetic head suspension.

The suspension may include, instead of the restraint plate having the single protrusion portion, a restraint plate having a connected surface connected to the surface of the supporting portion opposite from the disk surface, a coupling surface folded in such a direction that it comes close to the disk surface from the connected surface, and a contact surface which is folded from the free-end side of the coupled surface and which is connected to the surface of the member forming the load beam portion opposite from the disk surface in a surface-to-surface manner. A border line between the coupling surface and the contact surface is positioned on a load bending center line of the first and second extending portions along the widthwise direction of the suspension and is symmetrical with the longitudinal center line as a reference.

The configuration makes it possible to more effectively prevent the supporting point of the load beam portion from varying, thereby more largely raising the critical acceleration of the impulsive force which triggers the jump of the magnetic head slider.

In the above various configurations, a member forming the load beam portion may preferably include a connected area to which the elastic plate is connected, a tip-end area extending from the connected area toward the tip-end side of the suspension, and a base-end area extending from the connected area toward the base-end side of the suspension.

More preferably, the member forming the load beam portion may have flange portions which are provided at the opposite sides thereof in the widthwise direction of the suspension and which extend so as to be across the elastic plate.

The flange portions preferably have heights gradually decreased as they go from the base end to the tip end.

In the configuration where the load beam portion includes the base-end area, the base-end area is preferably provided with a balance mass member.

The configuration makes it possible to balance the mass of the portion closer to the base-end side of the suspension than the load bending center line with the mass of the portion closer to the tip-end side of the suspension than the load bending center line BL, thereby raising the critical acceleration of the impulsive force which triggers the jump of the magnetic head slider.

When a longitudinal direction of the magnetic head suspension between a center of gravity of an assembly formed by the load beam portion, the flexure portion and the balance mass member, and a load bending center line of the first and second extending portions along the widthwise direction of the suspension is Lg, and a length in the longitudinal direction of the suspension between the load bending center line and the center of gravity of a tip-end side portion of the assembly which is closer to the tip-end side of the suspension than the load bending center line is La, the balance mass member is preferably set to have a weight so that the length Lg and the length La have a relationship of $0 \leq Lg \leq 0.3 \times La$.

The configuration makes it possible to raise the critical acceleration of the impulsive force which triggers the jump of the magnetic head slider, in various conditions in which the magnetic head suspension may be used.

More preferably, the magnetic head suspension according to the present invention may further include a restriction plate connected to the supporting portion so as to be positioned on a side closer to the disk surface than the base-end side area of the load beam portion.

The restriction plate is placed to overlap with at least a portion of the balance mass member in a plan view.

According to the configuration, even if the balance mass member jumps in such a direction that it is separate from the disk surface when an external impulsive force is applied and then swings back toward the disk surface, it is possible to effectively prevent the balance mass member from impinging on the disk surface. It is also possible to effectively prevent the balance mass member from impinging on the disk surface even if an external impulsive force is applied to the balance mass member in such a direction as to cause the balance mass member to come close to the disk surface.

Instead of or in addition to the provision of the restriction plate, the balance mass member may include a connected portion connected to the load beam portion and a base-end-side bending portion positioned on a side closer to the base-end side of the suspension than the connected portion, and the balance mass member is configured so that its portion extending from the base-end-side bending portion up to a base-end edge is gradually separated from the disk surface with decreasing distance to the base-end edge than the connected portion.

According to the configuration, even if the balance mass member jumps in such a direction that it is separate from the disk surface when an external impulsive force is applied and then swings back toward the disk surface, it is possible to effectively prevent the balance mass member from impinging on the disk surface. It is also possible to effectively prevent the balance mass member from impinging on the disk surface even if an external impulsive force is applied to the balance mass member in such a direction as to cause the balance mass member to come close to the disk surface.

The balance mass member is preferably configured so that the base-end-side bending portion has a thickness smaller than those of the other areas of the balance mass member.

The magnetic head suspension may preferably include a signal wiring member which has an insulation layer and a conductive layer and which is integrally laminated on the flexure portion.

The signal wiring member includes a load-beam-portion side area supported directly or indirectly by the load beam portion, a supporting-portion side area supported directly or indirectly by the supporting portion, and an aerial area extending in air between the load-beam-portion side area and the supporting-portion side area.

In one embodiment, the load-beam-portion side area and the aerial area are symmetrical with the longitudinal center line of the magnetic head suspension as a reference, and the aerial area has at least one direction changing portion.

In another embodiment, the load-beam-portion side area and the aerial area are symmetrical with the longitudinal center line of the magnetic head suspension as a reference, and are placed to substantially surround the balance mass member in a plan view.

In the above various configurations, the elastic plate may be integrally formed with a member forming the flexure portion.

This configuration makes it possible to reduce the number of fabricating processes, thereby reducing the cost.

More preferably, the first and second extending portions of the elastic plate are provided with attenuation members which are integrally laminated thereon and which are made of the same materials as those of the insulation layer and the conductive layer.

The configuration makes it possible to provide the attenuation members without increasing the number of fabricating processes.

The present invention also provides, in order to achieve the aim, a magnetic head suspension including a load bending portion generating a load for pressing a magnetic head slider toward a disk surface, a load beam portion transmitting the load to the magnetic head slider, a supporting portion supporting the load beam portion through the load bending portion and including a concave portion which is defined by a pair of supporting pieces extending from opposite sides of the supporting portion in the widthwise direction to a tip-end side of the suspension and which is opened toward the tip-end side of the suspension, and a flexure portion connected to the load beam portion and supporting the magnetic head slider.

The suspension further including an elastically-deformable elastic plate having first and second ends in a widthwise direction of the suspension respectively connected to the pair of supporting pieces, and a balance mass member having a center portion which is connected to the elastic plate, a tip-end portion which is positioned on a tip-end side of the suspension than the center portion and which is connected to a base-end portion of the load beam portion, and a base-end portion which is positioned on a base-end side of the suspension than the center portion.

The elastic plate includes first and second connected areas which are respectively connected to the pair of supporting pieces, and a center area extending between the first and second connected areas.

The center area includes a center connected portion to which the balance mass member is connected, a first extending portion extending between the center connected portion and the first connected area, and a second extending portion extending between the center connected portion and the second connected area, so that the elastic plate forms the load bending portion.

Each of the first and second extending portions preferably has, at both a tip-end side and a base-end side, outer curved portions having a width gradually increased with decreasing distance to the corresponding connected area, and inner curved portions having a width gradually increased with decreasing distance to the center connected portion.

A member forming the load beam portion may integrally include a flange area having a center flat-plate portion positioned at the center in the widthwise direction of the suspension and a pair of flange portions provided at the opposite sides of the center flat-plate portion in the widthwise direction of the suspension, an elastic-plate area forming the elastic plate, and a flat-plate shaped coupling area which couples the center flat-plate portion of the flange area to a tip-end edge of the center connected portion of the elastic plate.

The configuration makes it possible to reduce the cost thanks to reduction of the number of members and assembling processes.

The tip-end portion of the balance mass member is preferably connected to the center flat-plate portion of the load beam portion, at a state where the tip-end portion of the balance mass member is interposed between the pair of flange portions.

More preferably, the balance mass member may have a tip-end-side bending portion at a portion corresponding to the coupling area.

In the configuration, the coupling area preferably has a width smaller than that of the base-end portion of the flange area.

In the above various configurations, the balance mass member preferably includes a base-end-side bending portion at the base-end portion, and is configured so that its portion extending from the base-end-side bending portion up to a base-end edge is gradually separated from the disk surface with decreasing distance to the base-end edge.

The balance mass member is preferably configured so that the bending portion has a thickness smaller than those of the other areas of the balance mass member.

In the above various configurations, the center connected portion of the elastic plate preferably includes a tip-end-side flat-surface portion which is positioned on a tip-end side of the suspension and which is connected to the center portion of the balance mass member at an attitude parallel to the center portion of the balance mass member, a center flat-surface portion which is extended from the tip-end-side flat-surface portion toward the base-end side of the suspension and which is inclined with respect to the tip-end-side flat-surface portion such that it gradually separates from the center portion of the balance mass member with increasing distance from the tip-end side toward the base-end side and to which the first and second extending portions are connected, and a base-end-side flat-surface portion which is extended toward the base-end side of the suspension from the center flat-surface portion through a bending portion and which is connected to the center portion of the balance mass member at an attitude parallel to the center portion of the balance mass member.

The center flat-surface portion is positioned within the same plane as the plane in which there exist the first and second extending portions and the first and second connected areas in a state before the magnetic head suspension is mounted to a data storage device, and the first and second extending portions are twisted to generate the load in a state where the magnetic head suspension is operated after being mounted to the data storage device.

The configuration makes it possible to obtain the load in a state where the suspension is operated after being mounted to the data storage device, without performing a twisting process on the first and second extending portions before the suspension is mounted to the data storage device.

In the above various configurations, when a length in the longitudinal direction of the magnetic head suspension between a center of gravity of an assembly formed by the load beam portion, the flexure portion and the balance mass member, and a load bending center line of the first and second extending portions along the widthwise direction of the suspension is Lg, and a length in the longitudinal direction of the suspension between the load bending center line and the center of gravity of a tip-end side portion of the assembly which is closer to the tip-end side of the suspension than the load bending center line is La, Lg and La is preferably set to have a relationship of $0 \leq Lg \leq 0.3 \times La$.

In the above various configuration, the pair of supporting pieces preferably have base-end portions which are positioned on the base-end side of the suspension, and tip-end portions which are positioned on the tip-end side of the suspension than the base-end portions and to which the elastic plate is connected, and the base-end portions have widths greater than those of the tip-end portions.

This configuration makes it possible to raise the resonance frequency of the supporting portion 610 in the twisting mode, thereby improving the positioning accuracy in moving the magnetic head slider to a target track.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

First Embodiment

Hereinafter, one preferred embodiment of a magnetic head suspension according to the present invention will be described, with reference to the attached drawings.

FIGS. 1A and 1B illustrate a top view of a magnetic head suspension 1A according to the present embodiment (a view illustrating the side opposite from a disk surface) and a bottom view of the same (a view illustrating the disk-surface side), respectively.

Figure 1:
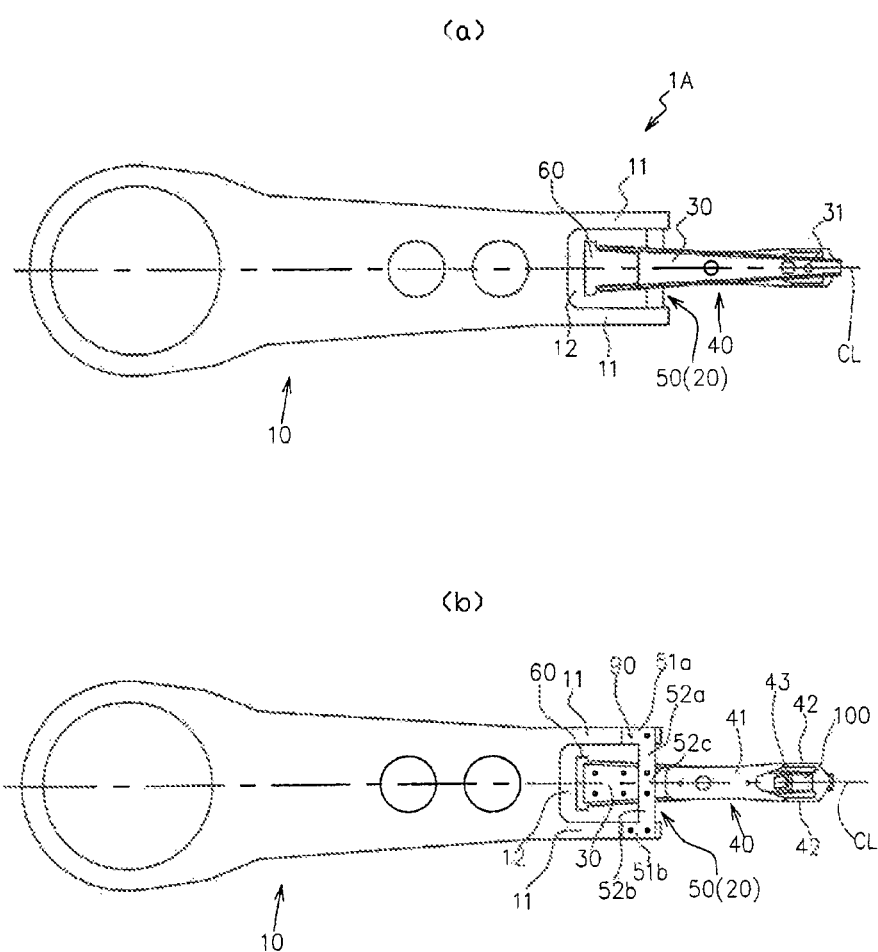
FIGS. 1A and 1B are a top view and a bottom view of a magnetic head suspension according to a first embodiment of the present invention, respectively.
Figure 2:
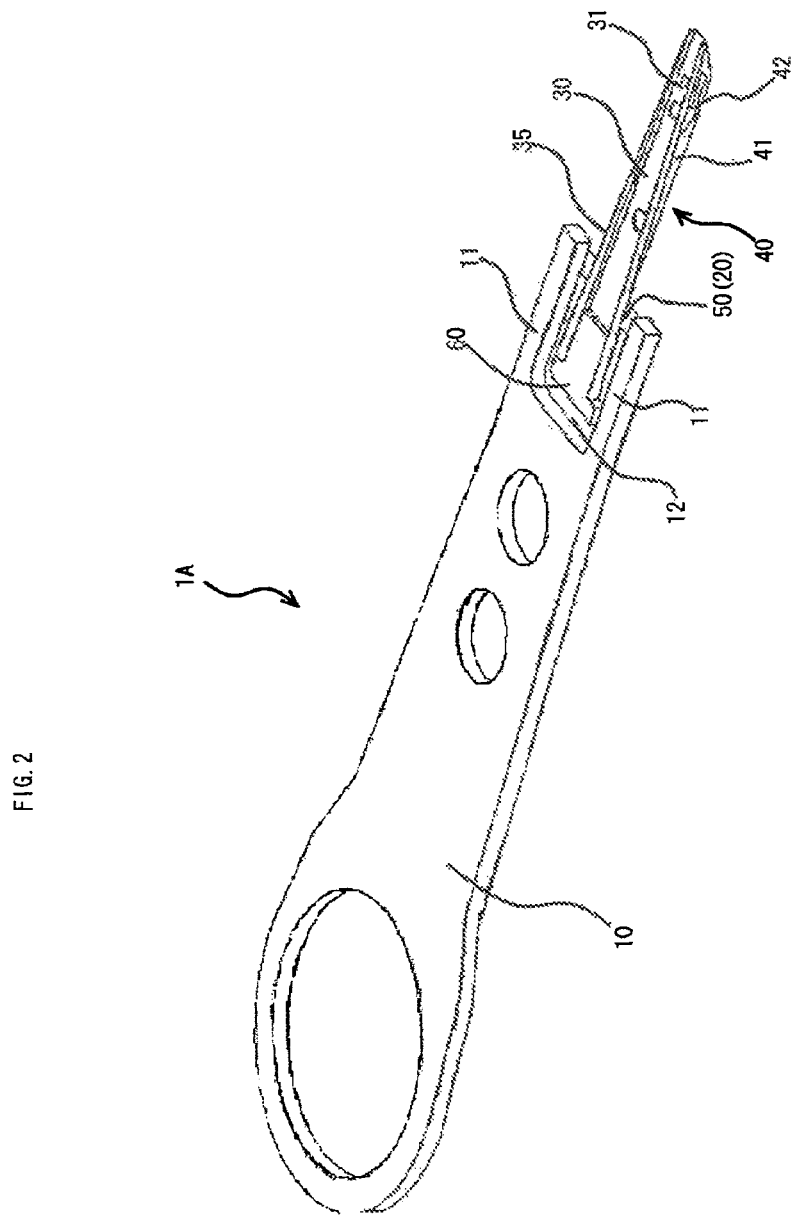
FIG. 2 is a perspective view of the magnetic head suspension shown in FIGS. 1A and 1B.

Further, FIG. 2 illustrates a perspective view of the magnetic head suspension 1A. In FIG. 1, the reference character 90 designates welding positions.

The magnetic head suspension 1A includes a load bending portion 20 which generates a load for pressing a magnetic head slider 100 against the disk surface, a load beam portion 30 which transmits the load to the magnetic head slider 100, a supporting portion 10 which supports the load beam portion 30 through the load bending portion 20, and a flexure portion 40 which is connected to the load beam portion 30 and supports the magnetic head slider 100.

The supporting portion 10 includes a main-body portion, a pair of supporting pieces 11 extending toward the tip end from the opposite sides of the main-body portion in the widthwise direction of the suspension, and a concave portion 12 which is defined by the pair of supporting pieces 11 so as to open to the tip-end side of the suspension, as illustrated in FIG. 1 and FIG. 2.

In the present embodiment, as illustrated in FIG. 1 and FIG. 2, the supporting portion 10 is formed to be an arm. The supporting portion 10 can be formed from a stainless-steel plate having a thickness in the range of about 0.1 mm to 0.8 mm.

Figure 3:
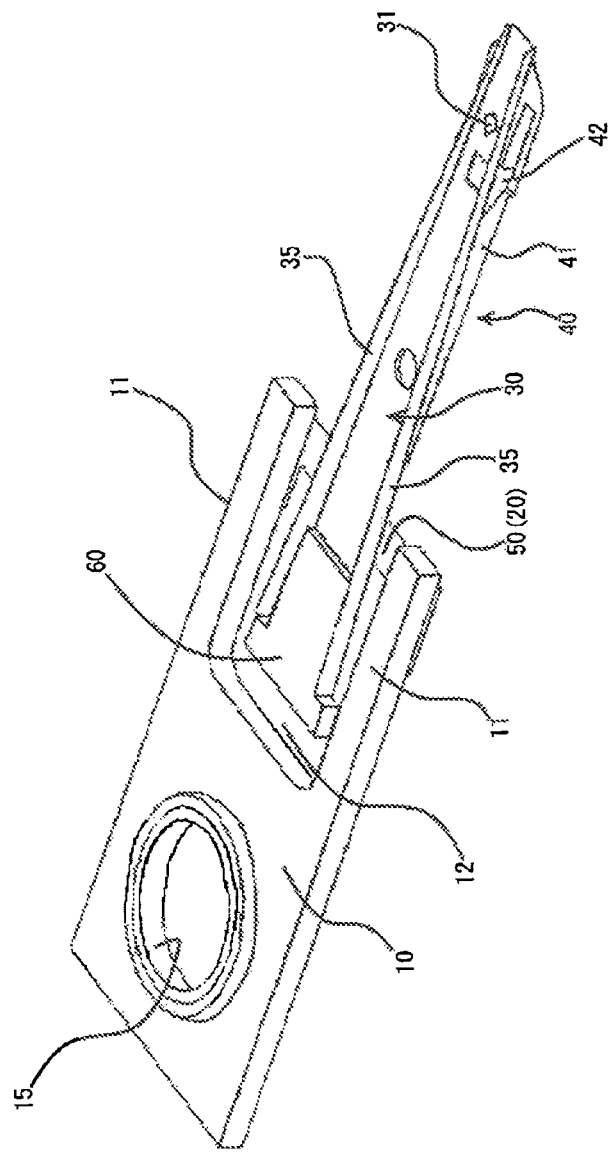
FIG. 3 is a perspective view of a magnetic head suspension modified from the suspension according to the first embodiment so as to have a base plate as a supporting portion.

Further, as illustrated in FIG. 3, the supporting portion 10 can also be formed to be a base plate including a boss portion 15 to be connected to a tip end of an arm of an E block through swage processing, instead of the arm.

The load beam portion 30 is a member for transmitting the load generated from the load bending portion 20 to the magnetic head slider 100 as described above and, therefore, is required to have a predetermined rigidity.

Accordingly, the load beam portion 30 is preferably formed from a member having a thickness greater than those of the load bending portion 20 and the flexure portion 40. The load beam portion 30 is formed from a stainless-steel plate having a thickness in the range of about 0.02 mm to 0.1 mm.

The load beam portion 30 is provided, at its tip-end portion, with a protrusion 31 which is a so-called dimple.

The protrusion 31 is protruded by, for example, about 0.05 mm to 0.1 mm, in such a direction that it comes close to the disk surface. The protrusion 31 is contacted with a Lack surface (a surface opposite from the disk surface) of a head mounting area 43 of the flexure portion 40, so that the load is transmitted to the head mounting area 43 of the flexure portion 40 through the protrusion 31.

Further, the detailed structure of the load beam portion 30 will be described later.

The flexure portion 40 is supported by the load beam portion 30 in a state where it supports the magnetic head slider 100.

More specifically, as illustrated in FIG. 1, the flexure portion 40 includes a main-body area 41 bonded to the lower surface of the load beam portion 30 (the surface thereof which faces to the disk surface) through welding or the like, a pair of supporting pieces 42 extending toward the tip-end side of the suspension from the main-body area 41, and the head mounting area 43 supported by the supporting pieces 42.

The head mounting area 43 supports the magnetic head slider 100 at its surface which faces to the disk surface.

As described above, the protrusion 31 is contacted with the back surface of the head mounting area 43, which allows the head mounting area 43 to sway flexibly in the direction of roll and in the direction of pitch, with the protrusion 31 used as a fulcrum.

The flexure portion 40 is formed from a member having lower rigidity than that of the load beam portion 30, in order to allow the head mounting area 43 to swing in the direction of roll and in the direction of pitch. The flexure portion 40 is formed from a stainless-steel plate having a thickness in the range of about 0.015 mm to 0.025 mm, for example.

In the present embodiment, the load bending portion 20 is formed from an elastic plate 50 which is supported in a dual-supported manner.

Figure 4:
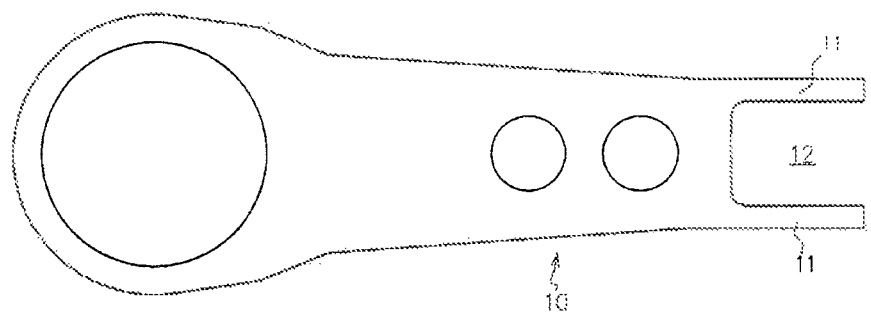
FIG. 4 is a top view of the supporting portion of the magnetic head suspension according to the first embodiment.

FIG. 4 illustrates a top view of the supporting portion 10 of the magnetic head suspension 1A according to the present embodiment.

As illustrated in FIGS. 1 to 4, the supporting portion 10 includes the main-body portion, the pair of supporting pieces 11 extending toward the tip-end side of the suspension from the opposite sides of the main-body portion in the widthwise direction of the suspension, and the concave portion 12 which is defined by the pair of supporting pieces 11 so as to open to the tip-end side of the suspension.

Further, the magnetic head suspension 1A includes the elastically-deformable elastic plate 50 which is connected to the pair of supporting pieces 11 at first and second ends in the widthwise direction of the magnetic head suspension, and the elastic plate 50 supports the load beam portion 30 such that the elastic plate 50 can form the load bending portion 20.

Figure 5:
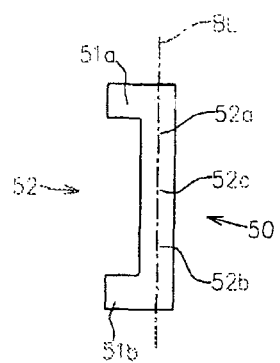
FIG. 5 is a bottom view of an elastic plate of the magnetic head suspension according to the first embodiment.

FIG. 5 illustrates a bottom view of the elastic plate 50.

As illustrated in FIG. 1, FIG. 2 and FIG. 5, the elastic plate 50 extends in the widthwise direction of the magnetic head suspension 1A in a state where it is supported at its opposite ends by the pair of supporting pieces 11.

In the present embodiment, the elastic plate 50 is connected to the bottom surfaces of the pair of supporting pieces 11 which are faced to the disk surface and also supports the load beam portion 30 at its upper surface opposite from the disk surface.

The elastic plate 50 includes first and second connected areas 51a and 51b which are connected to the pair of supporting pieces 11, respectively, and a center area 52 extending between the first and second connected areas 51a and 51b, as illustrated in FIG. 1 and FIG. 5.

The center area 52 includes a center connected portion 52c to which the member forming the load beam portion 30 is connected, a first extending portion 52a extending between the center connected portion 52c and the first connected area 51a, and a second extending portion 52b extending between the center connected portion 52c and the second connected area 51b, wherein the first extending portion 52a and the second extending portion 52b are shaped to be symmetrical with the longitudinal center line CL of the magnetic head suspension 1A as a reference.

The elastic plate 50 is twisted such that the tip end of the center area 52 comes close to the disk surface in a state where the first and second connected areas 51a and 51b are respectively connected to the pair of supporting pieces 11 and, thus, the elastic plate 50 is bound at its opposite ends, thereby generating the load.

Figure 6:
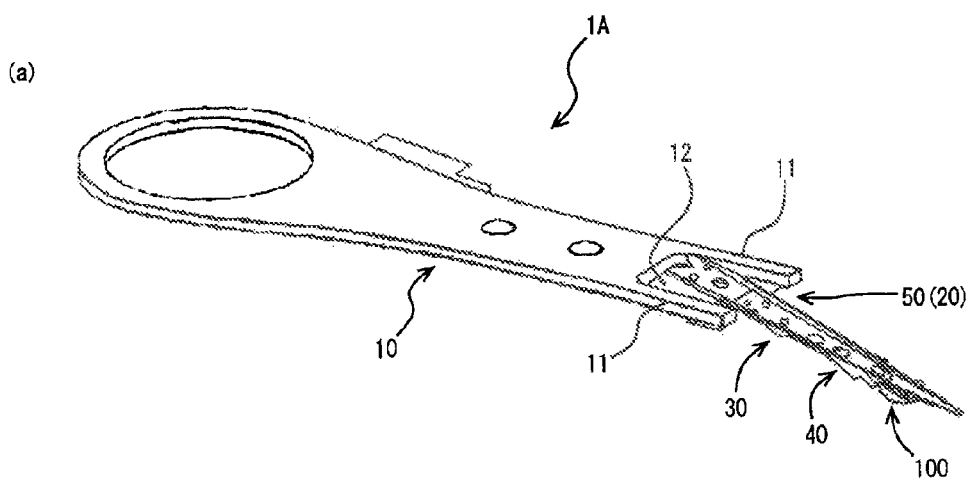
FIGS. 6A and 6B are perspective views of the magnetic head suspension according to the first embodiment in a state before it is mounted to a data storage device and in a state where it operated after being mounted to the date storage device, respectively.
Figure 6:
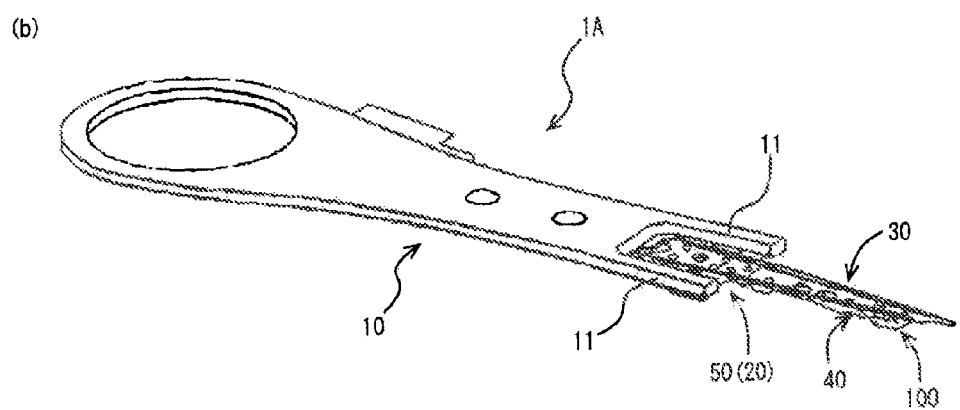

FIG. 6A and FIG. 6B illustrate a perspective view of the magnetic head suspension 1A including the elastic plate 50 in a state before the suspension 1A is mounted to a data storage device, and a perspective view of the magnetic head suspension 1A in a state where the magnetic head slider 100 is floated above the disk surface due to the air pressure caused by the rotation of the disk surface in the data storage device during the magnetic head suspension 1A is operated after being mounted to the data storage device.

Before the magnetic head suspension 1A is mounted to the data storage device such as a hard disk device, the elastic plate 50 is twisted such that the tip end of the center area 52 of the elastic plate 50 comes close to the disk surface, which causes the load beam portion 30 to take an attitude inclined with respect to the supporting portion 10 such that its tip end comes close to the disk surface, as illustrated in FIG. 6A.

As illustrated in FIG. 6B, in a state where the magnetic head suspension 1A operates to read and/or write data with the magnetic head slider 100, the elastic plate 50 is twisted back due to the air pressure caused by the rotation of the disk surface, which causes the load beam portion 30 to be substantially parallel to the disk surface, thereby causing the magnetic head slider 100 to float above the disk surface and to be maintained in a state where it can read and/or write data from and/or to the disk surface.

At this state, since the elastic plate 50 is twisted back due to the air pressure, the elastic plate 50 possess elasticity in such a direction that it presses the tip end of the load beam portion 30 against the disk surface. This possessed elasticity functions as the load for pressing the magnetic head slider 100 against the disk surface.

Figure 7:
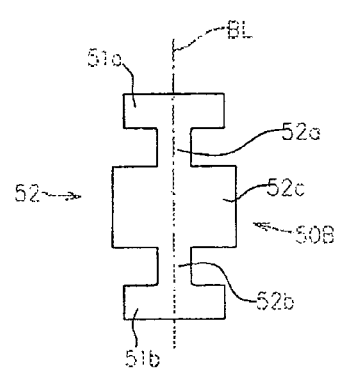
FIG. 7 is a bottom view of an exemplary modification of the elastic plate of the magnetic head suspension according to the first embodiment.

FIG. 7 is a bottom view of an exemplary modification 50B of the elastic plate 50.

Preferably, as illustrated in FIG. 7, the elastic plate 50B is formed such that the center connected portion 52c has a width greater than that of the first and second extending portions 52a and 52b.

With this structure, it is possible to easily perform the process for twisting the elastic plate 50B, while easily securing portions of the elastic plate 50B to which the load beam portion 30 is welded.

FIGS. 8A and 8B illustrate, respectively, a top perspective view illustrating a state where the elastic plate 5013 according to the modification example is twisted (a state before the magnetic head suspension 1A is mounted to the data storage device), and a top perspective view illustrating a state where the elastic plate 50B has been twisted back (a state where the elastic plate 50B has been twisted back due to the air pressure during the magnetic head suspension 1A is operated after being mounted to the data storage device).

Figure 8:
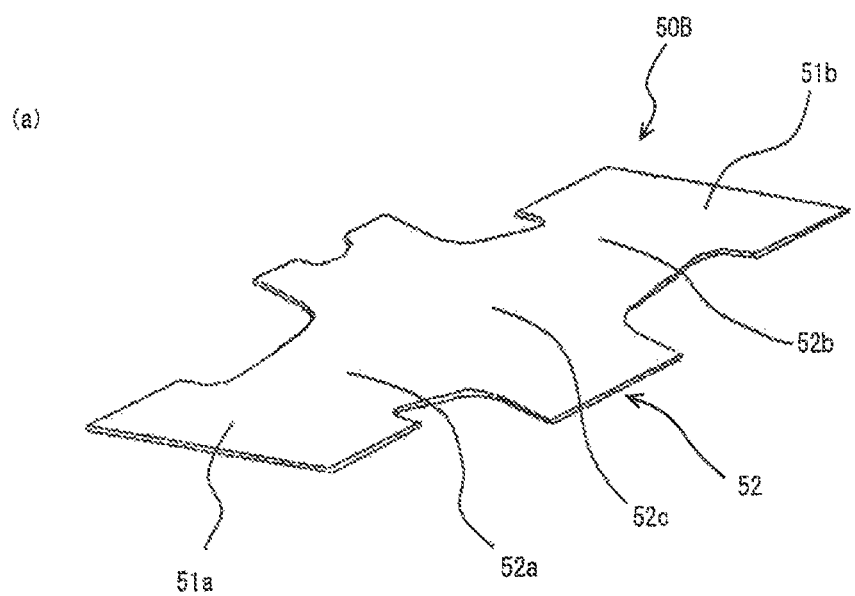
FIGS. 8A and 8B are perspective views of the elastic plate shown in FIG. 7 in a state of being twisted and in a state of being twisted back, respectively.
Figure 8:
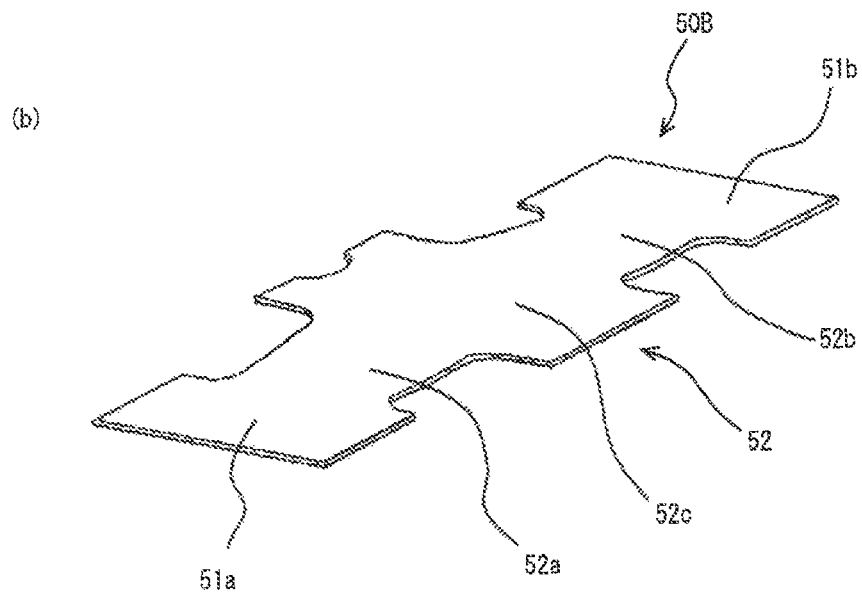

More preferably, as illustrated in FIG. 7 and FIG. 8, the center connected portion 52c is extended toward the tip-end side and toward the base-end side of the suspension, such that the center connected portion 52c is symmetrical with the load bending center line BL of the first and second extending portions 52a and 52b extended in the widthwise direction of the magnetic head suspension as a reference.

With this structure, it is possible to easily perform the process for twisting the elastic plate 50B about the load bending center line BL, while offering the aforementioned effects.

More preferably, as illustrated in FIG. 7 and FIG. 8, the elastic plate 50B is formed such that the first and second connected areas 51a and 51b have a width greater than that of the first and second extending portions 52a and 52b.

With this structure, it is possible to easily perform the process for twisting the elastic plate 50B, while securing portions of the first and second connected areas 51a and 51b to which the pair of supporting pieces 11 are welded.

Further, in the present embodiment, as previously described, the processing for twisting the elastic plate 50, 50B is performed before the magnetic head suspension 1A is mounted to the data storage device and, further, the elastic plate 50, 50B is twisted back through the air pressure in a state where the magnetic head suspension 1A is operated, in order to generate the load. However, instead of this structure, it is also possible to employ the following structure.

Figure 9:
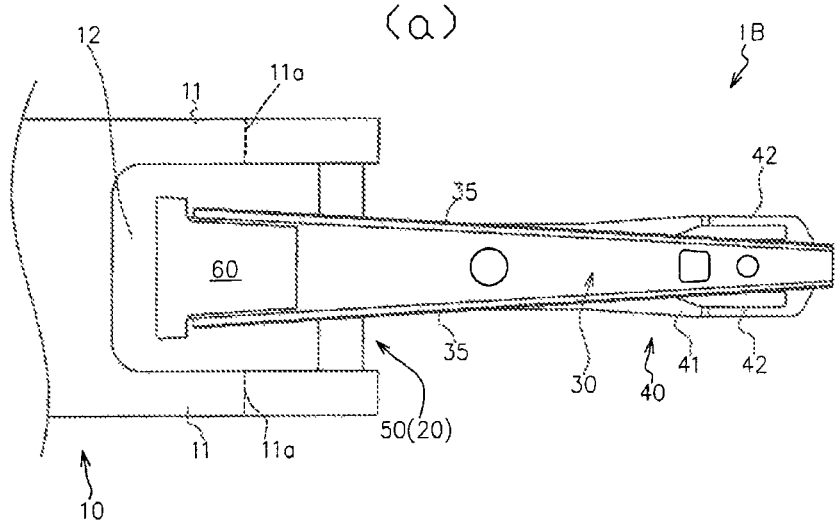
FIGS. 9A to 9C are a top view of a modified magnetic head suspension having a different structure for generating the load by the elastic plate, a side view of the same before it is mounted to the data storage device, and a side view of the same in a state where it is operated after being mounted to the data storage device, respectively.
Figure 9:
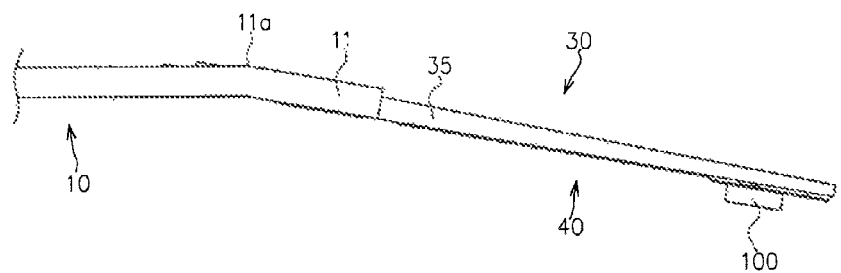
Figure 9:
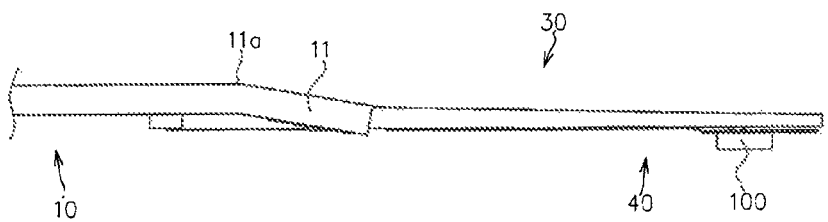

FIG. 9 illustrates a magnetic head suspension 1B according to a modified embodiment for causing the elastic plate 50, 50B to generate the load. Further, FIGS. 9A to 9C illustrate, respectively, a top view of the magnetic head suspension 1B according to the modified embodiment, a side view of the same before it is mounted to the data storage device, and a side view of the same in a state where it is operated after being mounted to the data storage device.

As illustrated in FIG. 9, in the magnetic head suspension 1B according to the modified embodiment, the pair of supporting pieces 11 are bended at a bended position 11a between the base end and the tip end in such a manner that their tip ends come close to the disk surface, and the elastic plate 50 is connected to the pair of supporting pieces 11 at a portion closer to the tip end than the bended position 11a.

That is, before the magnetic head suspension 1B is mounted to the data storage device, the load beam portion 30 takes an attitude inclined such that it gradually comes close to the disk surface with decreasing distance to the tip end, as illustrated in FIG. 9B.

Further, in a state where the magnetic head suspension 1B is operated after being mounted to the data storage device, the elastic plate 50 is twisted through the air pressure such that the load beam portion 30 is substantially parallel to the disk surface, which causes the elastic plate 50 to generate the load (see FIG. 9C).

As described above, the magnetic head suspension 1A according to the present embodiment and the magnetic head suspension 1B according to the modified embodiment illustrated in FIG. 9 are configured so that the elastic plate 50, 50B which is supported at its opposite ends functions as the load bending portion 20, thereby offering effects as follows.

That is, a conventional magnetic head suspension includes a load bending portion formed to be a cantilever spring which is supported at its base-end portion by a supporting portion such as an arm and supports a load beam portion at its free end portion.

With this conventional structure, when an external impulsive force is applied thereto, this will largely vary the supporting point of the load beam portion (namely, the point of the load beam portion to which the load bending portion is connected), in the direction orthogonal to the disk surface. Accordingly, even if the weight of the load beam portion is reduced without involving the reduction of the rigidity thereof and/or the masses of the tip-end side and the base-end side of the load beam portion as the supporting point of the load beam portion as a reference are balanced, it is impossible to suppress sufficiently the jump of the magnetic head slider in the direction orthogonal to the disk surface.

On the contrary; the magnetic head suspension 1A according to the present embodiment and the magnetic head suspension 1B according to the modified embodiment are configured so that the elastic plate 50, 50B supported at its opposite ends functions as the load bending portion 20.

With this structure, when an external impulsive force is applied thereto, it is possible to effectively prevent the supporting point of the load beam portion 30 (namely, the point of the member forming the load beam portion 30 which is connected to the elastic member 50, 50B) from varying in the direction orthogonal to the disk surface, thus suppressing the jump of the magnetic head slider 100 and largely raising the critical acceleration of the impulsive force which triggers the jump of the magnetic head slider 100.

Further, in the magnetic head suspension 1B according to the modified embodiment illustrated in FIG. 9, it is possible to set the value of the load, through the bending angle of the pair of supporting pieces 11. This can offer the advantage of stably controlling the load.

Further, the elastic plate 50, 50B is made of a member capable of generating the load by its twisting action. That is, the elastic plate 50, 50B is formed from a member having a thickness smaller than that of the load beam portion 30 and can be preferably formed from, for example, a stainless-steel plate having a thickness in the range of about 0.02 mm to 0.1 mm.

Figure 10:
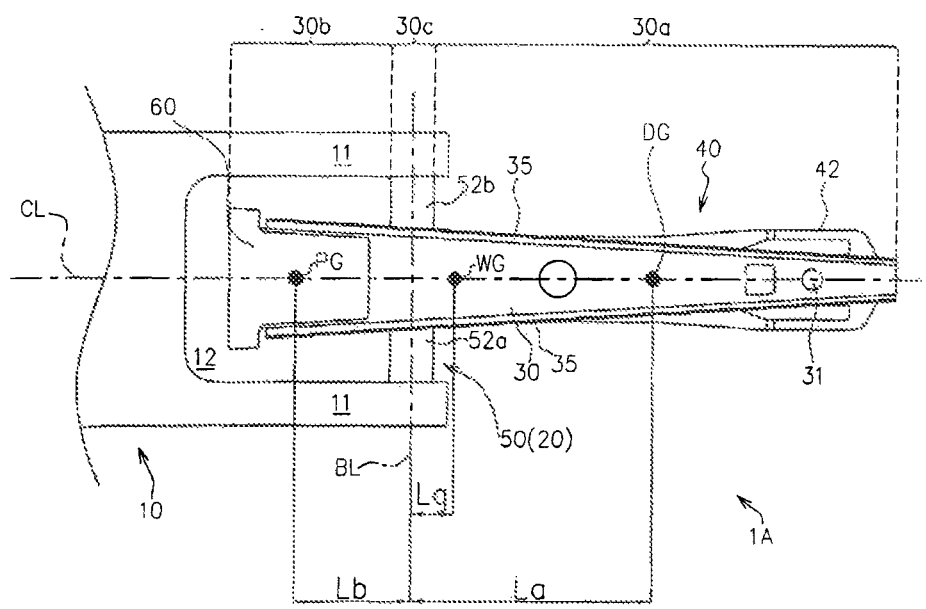
FIG. 10 is a partially-enlarged top view of the magnetic head suspension according to the first embodiment.

FIG. 10 illustrates a partially-enlarged top view of the magnetic head suspension 1A.

Preferably, the load beam portion 30 includes a base-end area 30b extending from the elastic plate 50 toward the base end, in addition to a tip-end area 30a which extends from the elastic plate 50 toward the tip end and supports the flexure portion 40, as illustrated in FIG. 10.

That is, the member forming the load beam portion 30 includes a connected area 30c connected to the elastic plate 50, the tip-end area 30a extending from the connected area 30c toward the tip-end side of the suspension, and the base-end area 30b extending from the connected area 30c toward the base-end side of the suspension.

The base-end area 30b provided in the load beam portion 30 makes it possible to balance the mass of the portion of the load beam portion 30 closer to the base end of the suspension than the load bending center line BL with the mass of the portion of the load beam portion 30 closer to the tip-end side of the suspension than the load bending center line BL.

Figure 11:
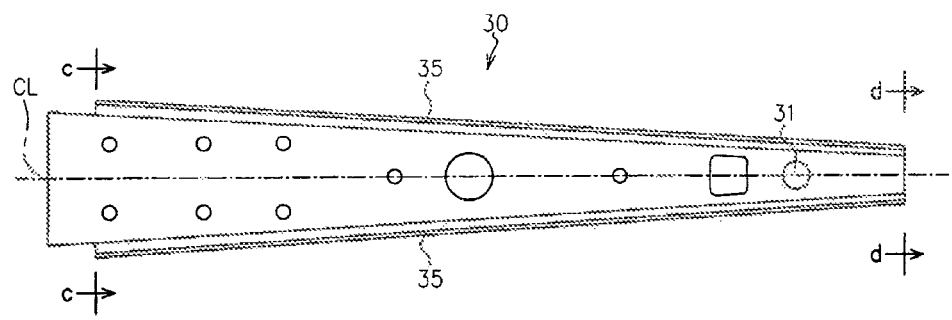
FIGS. 11A to 11D are a top view of a load beam portion of the magnetic head suspension according to the first embodiment, a side view thereof, a cross-sectional view taken along the line c-c in FIG. 11A, and a cross-sectional view taken along the line d-d in FIG. 11A, respectively.
Figure 11:
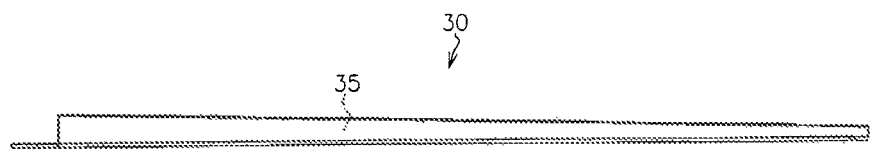
Figure 11:
Figure 11:
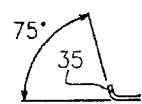

FIG. 11 illustrates the load beam portion 30, wherein FIGS. 11A to 11D are a top view thereof, a side view thereof, a cross-sectional view taken along the line c-c in FIG. 11A, and a cross-sectional view taken along the line d-d in FIG. 11A, respectively.

As illustrated in FIG. 10 and FIG. 11, the member forming the load beam portion 30 has flange portions 35 extending at the opposite sides thereof in the longitudinal direction of the suspension so as to be across the elastic plate 50.

More preferably, the flange portions 35 are configured such that their heights gradually decrease as it goes from the base end to the tip end.

With this structure, it is possible to increase the mass of the base-end area 30b of the load beam portion 30 with respect to the mass of the tip-end area 30a while increasing the rigidity of the load beam portion 30, which can effectively balance the mass of the portion of the load beam 30 closer to the base-end side of the suspension than the load bending center line BL with the mass of the portion of the load beam portion 30 closer to the tip-end side of the suspension than the load bending center line BL.

The magnetic head suspension 1A according to the present embodiment includes a balance mass member 60 secured to the base-end area 30b of the load beam portion 30, in addition to the structure explained above, as illustrated in FIGS. 1, 2, 3, 9 and 10.

By providing the balance mass member 60, it is possible to balance the mass of the portion of the load beam portion 30 closer to the base-end side of the suspension than the elastic plate 50 with the mass of the portion of the load beam portion 30 closer to the tip-end side of the suspension, while reducing the length of the base-end area 30b as much as possible.

In the present embodiment, the base-end area 30b is configured to position in the concave portion 12 in a plan view.

Hereinafter, there will be described the results of analyses of the critical acceleration (the acceleration of an impulsive force which triggers the jump of the magnetic head slider 100) in an example (hereinafter, referred to as an example 1) of the magnetic head suspension 1A according to the present embodiment, and the critical acceleration in an example (hereinafter, referred to as a comparative example 1) of the conventional magnetic head suspension illustrated in FIG. 12, on the basis of a finite-element method.

The aforementioned analyses were performed under the following condition.

In the example 1, the supporting portion 10, the load beam portion 30, the elastic plate 50 forming the load bending portion 20 and the flexure portion 40 are all made of stainless-steel plates (SUS304) having thicknesses of 0.4 mm, 0.025 mm, 0.02 mm and 0.02 mm, respectively.

In the example 1, a length La (see FIG. 10) in the longitudinal direction of the magnetic head suspension between the load bending center line BL and the center of gravity DG of the tip-end side portion of the assembly constituted by the load beam portion 30, the flexure portion 40 and the balance mass member 60 which is closer to the tip-end side of the suspension than the load bending center line BL was set to 3.316 mm. Further, a length Lg (see FIG. 10) in the longitudinal direction of the magnetic head suspension between the center of gravity WG of the entire assembly and the load bending center line BL was set to 0.25 mm. Further, a length Lb (see FIG. 10) in the longitudinal direction of the magnetic head suspension between the load bending center BL and the center of gravity PG of the base-end side portion of the aforementioned assembly which is closer to the base-end side of the suspension than the load bending center line BL was set to 1.54 mm. It is preferable to make the position of the center of gravity of the portion of the aforementioned assembly which is closer to the base-end side of the suspension than the load bending center line BL to be closer to the bending load center line BL as much as possible, in order to prevent the reduction of the resonance frequency of the magnetic head suspension 1A, particularly the SWAY-mode frequency (the resonance-mode frequency at a time when the magnetic head slider 100 is moved in the seek direction parallel to the disk surface).

Figure 12:
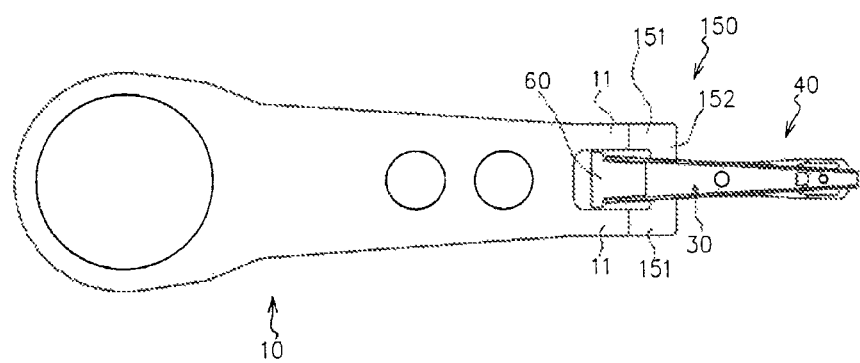
FIGS. 12A and 12B are a top view of a bottom view of a conventional magnetic head suspension having a load bending portion supported in a cantilever manner, respectively.
Figure 12:
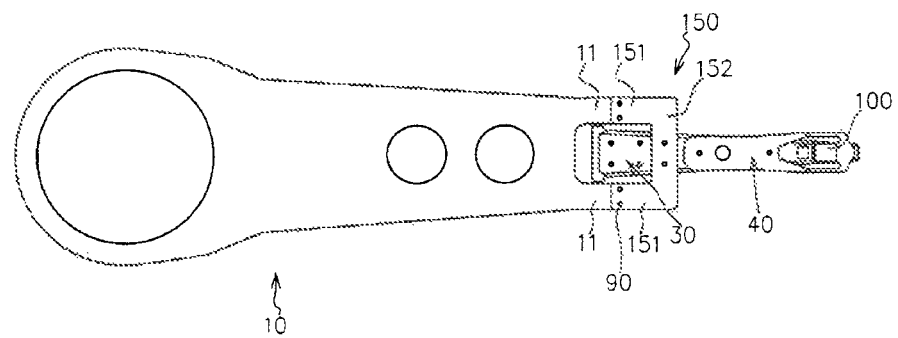

The comparative example 1 has an elastic plate 150 supported in a cantilever manner by the supporting portion 10 as illustrated in FIG. 12, instead of the elastic plate 50 supported at its opposite ends by the supporting portion 10.

More specifically, the elastic plate 150 has a pair of elastic pieces 151 supported at their base ends by the pair of supporting pieces 11, and a coupling piece 152 coupling the free end portions of the pair of elastic pieces 151 to each other, wherein the load beam portion 30 is connected to the coupling piece 152.

In the comparative example 1 having the aforementioned structure, the elastic pieces supported in a cantilever manner functions as a load bending portion for generating the load for pressing the magnetic head slider 100 against the disk surface.

The analysis on the comparative example 1 was performed under the same condition as that for the example 1, except that the thickness of the elastic plate 150 was set to 0.034 mm.

Figure 13:
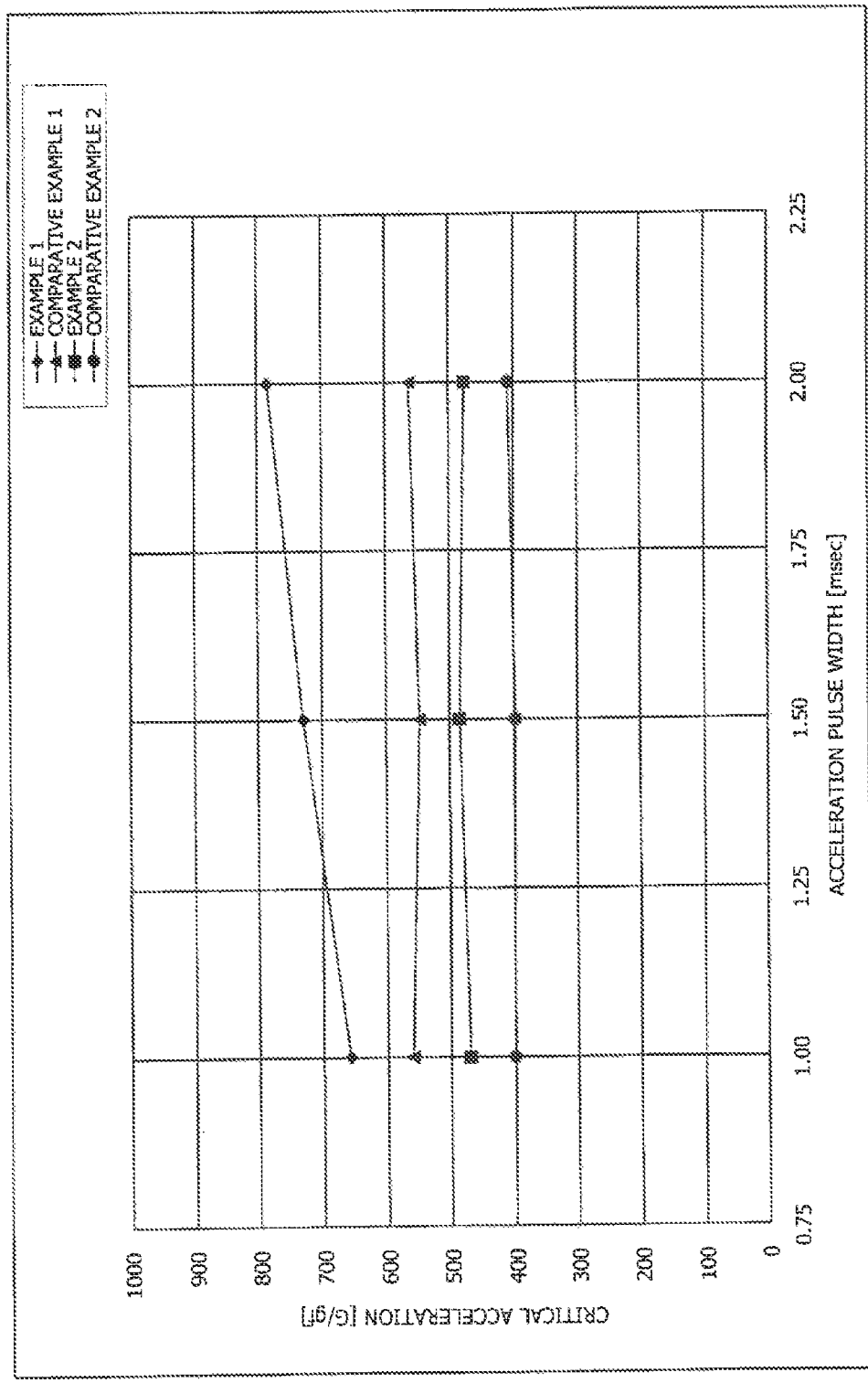
FIG. 13 is a graph showing the results of analyses of the critical acceleration on the basis of a finite-element method in an example (example 1) of the magnetic head suspension according to the first embodiment, an example (example 2) of a magnetic head suspension modified from the first embodiment, and examples (comparative example 1 and 2) of the conventional magnetic head suspension, when impulsive waves having pulse widths of 1.00 msec, 1.50 msec and 2.00 msec are applied thereto.

Analyses were performed for the critical accelerations of the example 1 and the comparative example 1 when impulsive waves (half-sine wave accelerations) having pulse widths of 1.00 msec, 1.50 msec and 2.00 msec were applied thereto, on the basis of a finite-element method. FIG. 13 illustrates the results of the analyses.

As illustrated in FIG. 13, the critical acceleration in the example 1 is higher than that in the comparative example 1, for any of the impulsive waves having the pulse widths.

More specifically, it is revealed that the critical acceleration in the example 1 becomes higher as the pulse width of the impulsive wave is increased, while the critical acceleration in the comparative example 1 is substantially constant for any of the pulse widths. The impulsive wave having a pulse width of 1.00 msec corresponds to an impact on the data storage device when the data storage device is fallen on a relatively-hard material such as a concrete. The impulsive wave having a pulse width of 2.00 msec corresponds to an impact on the data storage device when the data storage device is fallen on a relatively-soft member such as a wood desk, for example.

The same analyses were performed on an example (hereinafter, referred to as an example 2) of the magnetic head suspension provided by eliminating the balance mass member 60 from the example 1 and an example (hereinafter, referred to as a comparative example 2) of the magnetic head suspension provided by eliminating the balance mass member 60 from the comparative example 1. The results of these analyses are also illustrated in FIG. 13.

As is apparent from FIG. 13, the critical acceleration in the example 2 is higher than that in the comparative example 2 for any of the impulsive waves having the pulse widths, also in a configuration having no balance mass member 60.

Figure 14:
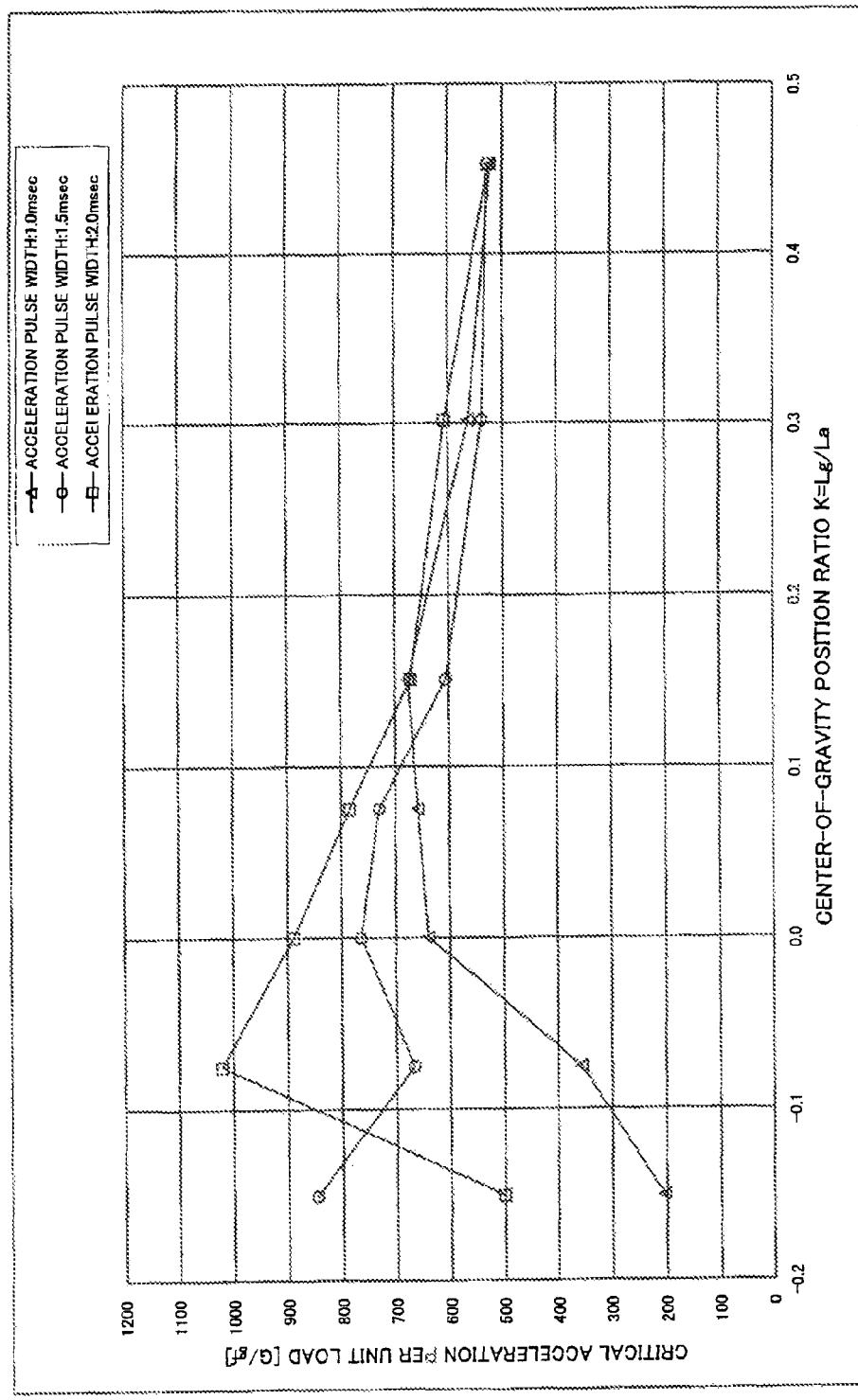
FIG. 14 is a graph showing the results of the analyses, on the basis of a finite-element method, for the critical acceleration in the example 1, when the ratio K=Lg/La (center-of-gravity position ratio) of the length Lg between the center of gravity (entire gravity) of the assembly formed by the load beam portion, the flexure portion and the balance mass member, and a load bending center line of the elastic plate to the length La between the center of gravity (tip-end side gravity) of the tip-end side portion of the assembly which is closer to the tip-end side of the suspension than the load bending center line and the load bending center line is varied.

Further, analyses were performed, on the basis of a finite-element method, for the critical acceleration in the example 1, when the ratio K=Lg/La (hereinafter, referred to as center-of-gravity position ratio) of the length Lg between the center of entire gravity WG and the load bending center line BL to the length La between the center of tip-end side gravity DG and the load bending center line BL was varied. FIG. 14 illustrates the results of the analyses.

Please note that the range of K<0 means that the mass of the balance mass member 60 is set such that the position of the center of the gravity WG of the entire assembly is closer to the base-end side of the suspension than the load bending center line BL.

As is apparent from FIG. 14, in the range of K<0, the critical acceleration for an applied impulsive wave having an acceleration pulse width of 1.0 msec is suddenly decreased.

Further, as is apparent from FIG. 14, it is revealed that, within the range of K≦0.45, the example 1 has a critical acceleration characteristic equal to or higher than that of the comparative example 1 for all of the pulse widths.

Accordingly, it is preferable that the center-of-gravity position ratio K falls in the range of 0≦K≦0.45.

Further, as is apparent from FIG. 14, within the range of K≦0.3, the critical acceleration in the example 1 is clearly higher than that in the comparative example 1, for an impulsive wave having a pulse width of 2.0 msec, that is in the case where the data storage device fallen on a relatively-soft material such as a wood desk.

Accordingly, it is preferable to set the mass of the balance mass member 60 such that K falls within the range of 0≦K≦0.3, according to the condition under which the data storage device utilizing the magnetic head suspension is used.

Further, it is revealed that, within the range of K≦0.2, the critical acceleration in the example 1 is higher than that in the comparative example 1, for all of the impulsive waves having the pulse waves.

Accordingly, it is more preferable to set the mass of the balance mass member 60 such that K falls within the range of 0≦K≦0.2.

Figure 15:
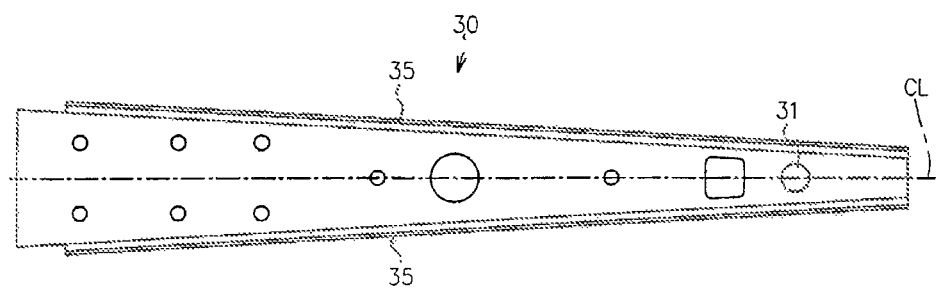
FIGS. 15A to 15C are a top view of a load beam portion modified from the load beam portion of the magnetic head suspension according to the first embodiment, a side view thereof, and a cross-sectional view taken along the line c-c in FIG. 15A, respectively.
Figure 15:
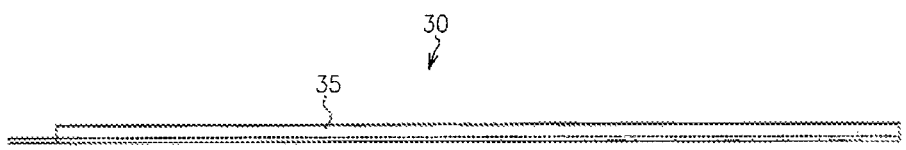
Figure 15:
Figure 16:
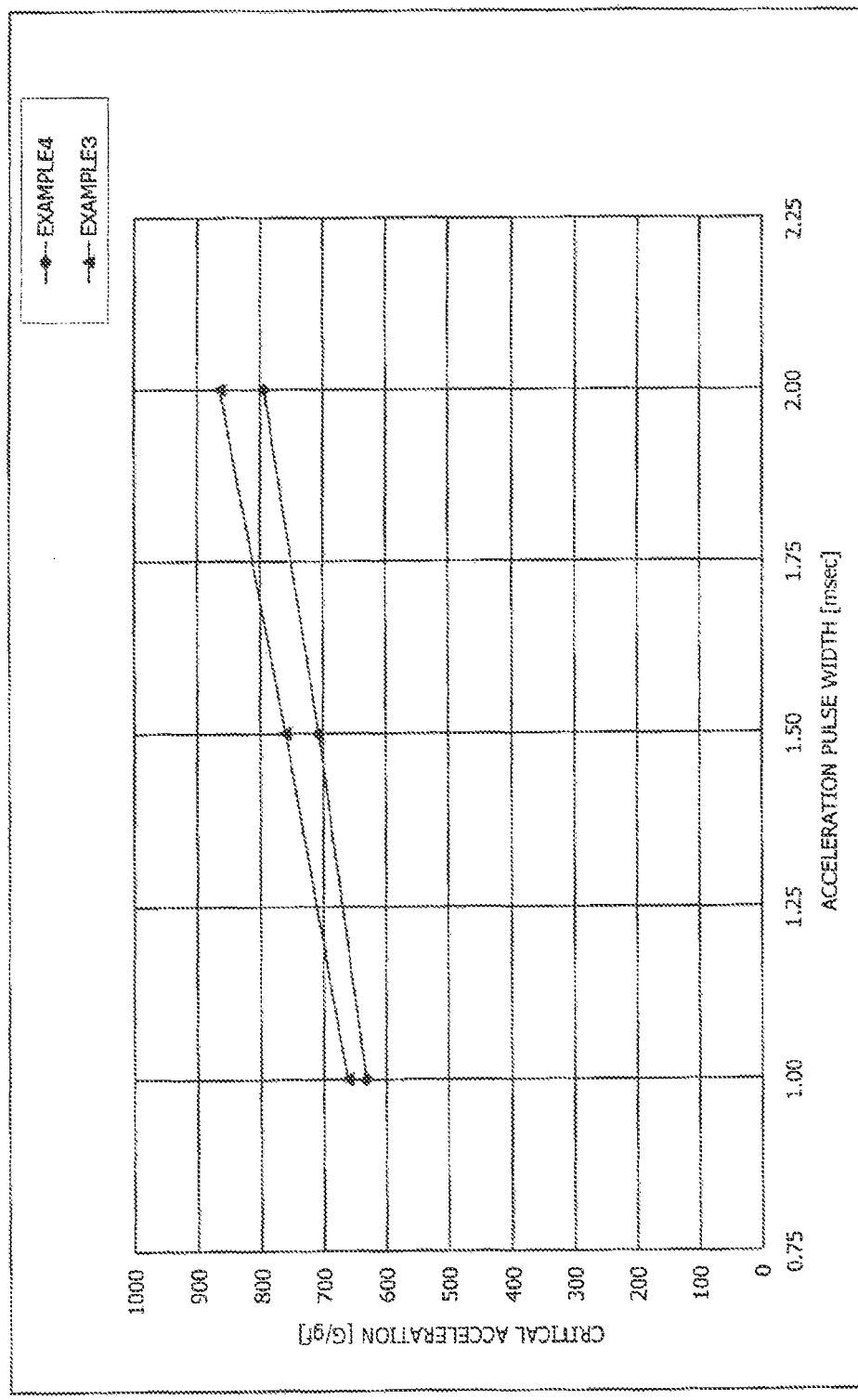
FIG. 16 is a graph showing the results of the analyses, on the basis of a finite-element method, on an example (example 3) of the magnetic head suspension having the flange portions structured such that their heights are gradually decreased as they go from the base end to the tip end and an example (example 4) of the magnetic head suspension having flange portions having substantially a constant height, when impulsive waves having pulse widths of 1.00 msec, 1.50 msec and 2.00 msec are applied thereto.

Further, analyses were performed, on the basis of a finite-element method, on an example (hereinafter, referred to as an example 3, see FIG. 11) of the magnetic head suspension 1A having the flange portions 35 structured such that their heights were gradually decreased as they went from the base end to the tip end and an example (hereinafter, referred to as an example 4, see FIG. 15) of the magnetic head suspension having flange portions 35 having substantially a constant height, when impulsive waves having pulse widths of 1.00 msec, 1.50 msec and 2.00 msec were applied thereto. FIG. 16 illustrates the results of the analyses.

In the example 3, the flange portions 35 are folded at an angle of 75° and also has a height of 0.345 mm at its portion closest to the base end and has a height of 0.160 mm at its portion closest to the tip end. On the other hand, in the example 4, the flange portions 35 are folded at the same angle as that of the example 3 and also has a constant height of 0.180 mm from its portion closest to the base end to its portion closest to the tip end.

As is apparent from FIG. 16, the example 3 having the flange portions 35 formed such that their heights are gradually decreased from the base end to the tip end exhibits a higher critical acceleration than that of the example 4 having the flange portion 35 having the constant height, for all of the pulse widths.

Preferably, a signal wiring member 70 which is electrically connected at a first end to the magnetic head slider 100 and also is capable of outputting electrical signals to the outside at a second end thereof can be laminated on the flexure portion 40, such that the signal wiring member 70 is integral with the flexure portion 40.

FIGS. 17A and 17B illustrate bottom views illustrating an example 1C and an alternative example 1D of the magnetic head suspension 1C having the signal wiring member 70 laminated on the flexure portion 40 such that they are integral with each other.

Figure 17:
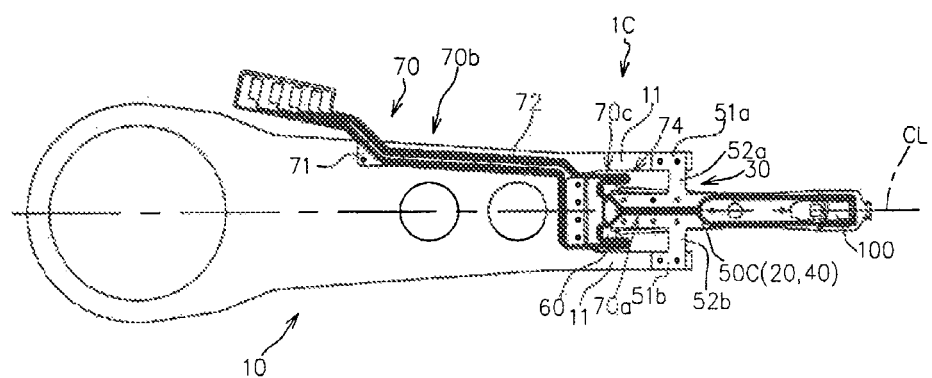
FIGS. 17A and 17B are bottom views of an example and alternative example of a modified magnetic head suspension which is modified from the first embodiment so as to have a signal wiring member integrally laminated on a flexure portion, respectively.
Figure 17:
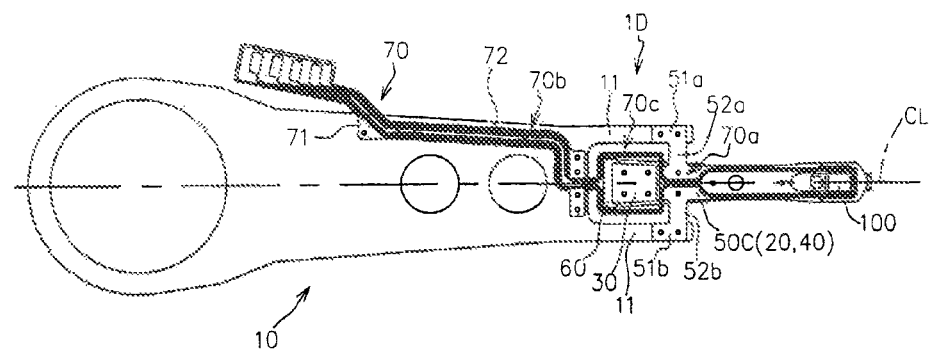

More specifically, as illustrated in FIG. 17, the signal wiring member 70 includes an insulation layer 71 laminated on the member forming the flexure portion 40 and a conductive layer 72 laminated on the insulation layer 71 and, preferably, can further include a protective layer (not illustrated) covering the conductive layer.

In the structure including the signal wiring member 70 formed integrally with the flexure portion 40, the signal wiring member 70 preferably includes a load-beam-portion side area 70a supported directly or indirectly by the load beam portion 30 through the flexure portion 40, a supporting-portion side area 70b supported directly or indirectly by the supporting portion 10, and an aerial area 70c extending in air between the load-beam-portion side area 70a and the supporting-portion side area 70b.

In the magnetic head suspension 1C illustrated in FIG. 17A, the load-beam-portion side area 70a and the aerial area 70c are symmetrical with the longitudinal center line CL of the magnetic head suspension as a reference and, also, the aerial area 70c has at least one direction changing portion 74.

In the magnetic head suspension 1D illustrated in FIG. 17B, the load-beam-portion side area 70a and the aerial area 70c are symmetrical with the longitudinal center line BL of the magnetic head suspension as a reference and, also, are placed to substantially surround the balance mass member 60 in a plan view.

With the example 1C and the alternative example 1D, it is possible to effectively prevent the signal wiring member from interfering with the movement of the balance mass member 60 when the impulsive wave was applied thereto.

Further, in the embodiment illustrated in FIG. 17A, the direction changing portion 74 has a U-shape in a plan view, which may induce vibrations of the U-shaped portion in a plan view due to the air flows caused by the rotation of the disk. However, in the embodiment illustrated in FIG. 17B, it is possible to prevent the influence of the air flows caused by the rotation of the disk.

Further, the magnetic head assemblies 1C and 1D include an elastic plate 50C configured to form both the load bending portion 20 and the flexure portion 40 as illustrated in FIGS. 17A and 17B.

That is, the elastic plate 50C is formed integrally with the member forming the flexure 40.

With this structure, it is possible to reduce the number of assembling processes and simplify the fabrication processes.

Figure 18:
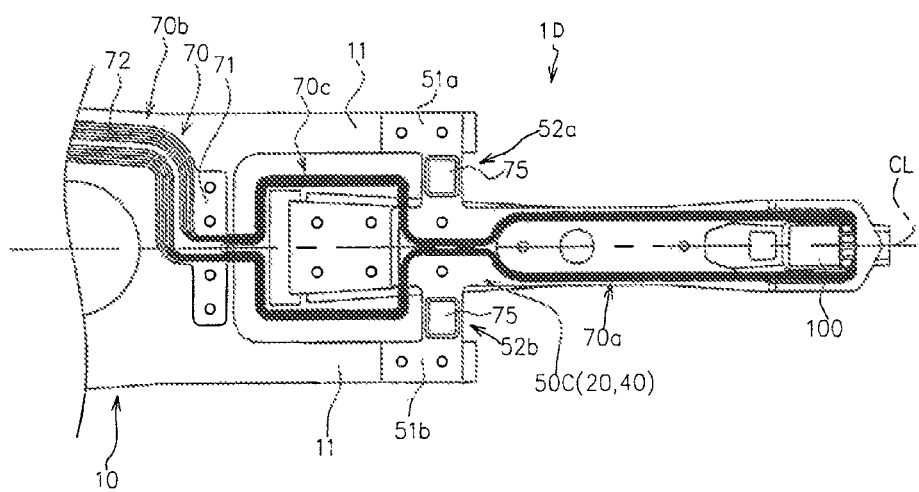
FIG. 18 is a partially-enlarged bottom view of the alternative example of the modified magnetic head suspension in which the signal wiring member integrally laminated on the flexure portion.

More preferably, as illustrated in FIG. 18, the first and second extending portions 52a and 52b of the elastic plate 50C are provided with attenuation members 75 including viscoelastic members, which can stop the vibration of the elastic plate 50C as rapidly as possible.

The attenuation members 75 are placed to be symmetrical with the longitudinal center line as a reference. In the embodiment illustrated in FIG. 18, there are provided a pair of attenuation members 75 placed to be symmetrical to each other with the longitudinal center line as a reference.

In the structure including the elastic plate 50C formed integrally with the member forming the flexure portion 40 and also including the signal wiring member 70 laminated on the flexure portion 40 such that they are integral with each other, the attenuation members 75 are preferably made of the same materials as those of the insulation layer 71 and the conductive layer 72.

That is, it is preferable to laminate the attenuation members 75 formed by the insulation layer 71 and the conductive layer 72 on the first and second extending portions 52a and 52b, at the same time as laminating the insulation layer 71 and the conductive layer 72 on the flexure portion 40, which can form the attenuation members 75 without increasing the number of fabrication processes.

Further, the conductive layer 72 can be made of a metal such as Cu, and the insulation layer 71 can be made of a resin such as polyimide.

Second Embodiment

Hereinafter, there will be described another embodiment of the magnetic head suspension according to the present invention with reference to the attached drawings.

FIGS. 19A to 19C illustrate, respectively, a top view of a magnetic head suspension 2A according to the second embodiment, a bottom view of the same, and a cross-sectional view taken along the line c-c in FIG. 19A.

Figure 20:
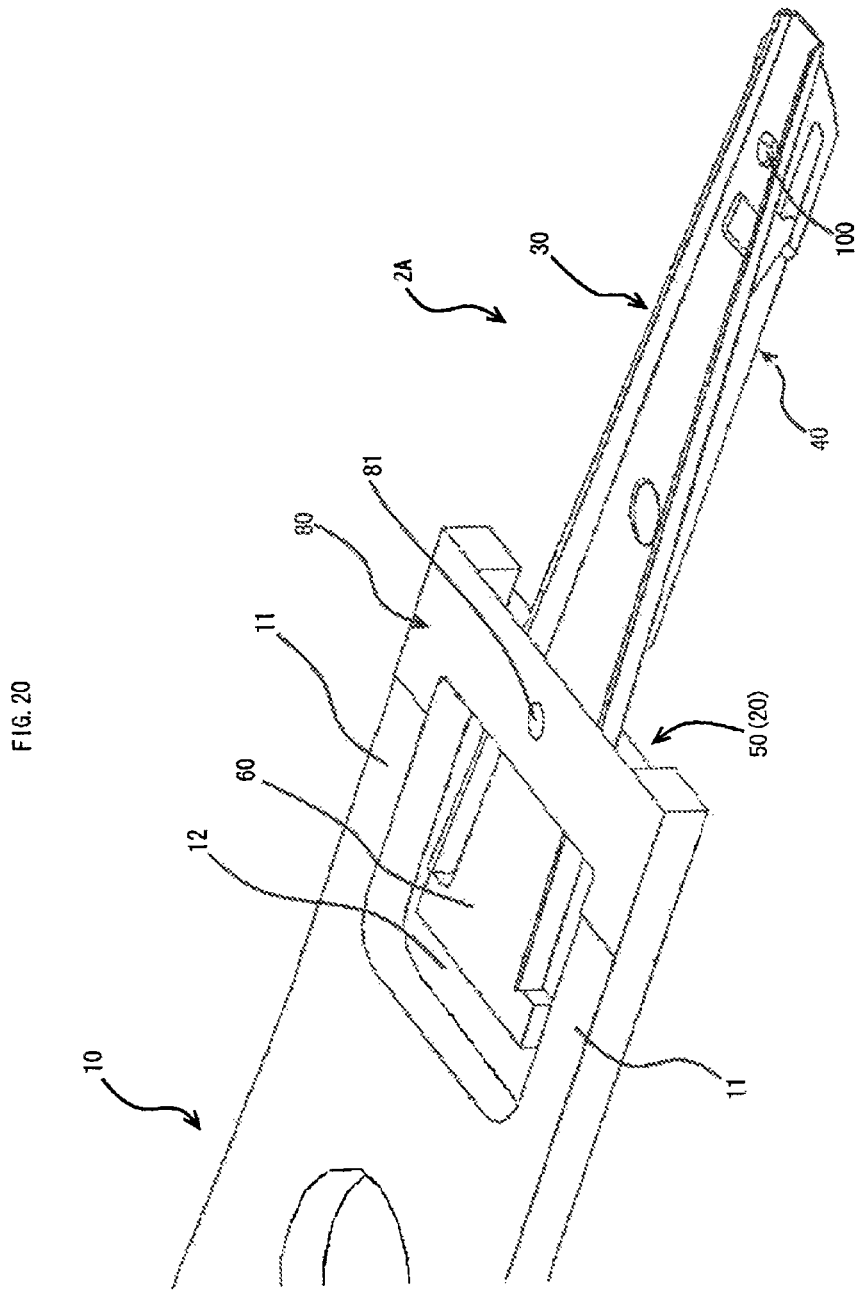
FIG. 20 is a perspective view of the magnetic head suspension according to the second embodiment.

Further, FIG. 20 illustrates a perspective view of the magnetic head suspension 2A.

Further, in the drawings, the same components as those of the first embodiment are designated by the same reference characters and will not be described in detail.

Figure 19:
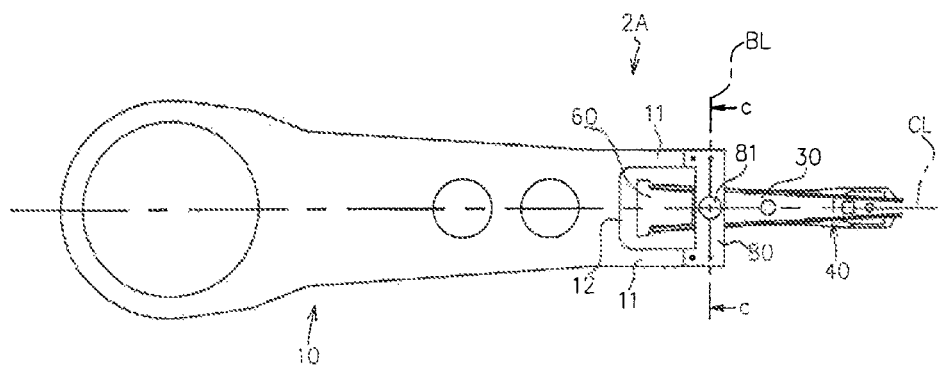
FIGS. 19A to 19C are, respectively, a top view of a magnetic head suspension according to a second embodiment of the present invention, a bottom view thereof, and a cross-sectional view taken along the line c-c in FIG. 19A.
Figure 19:
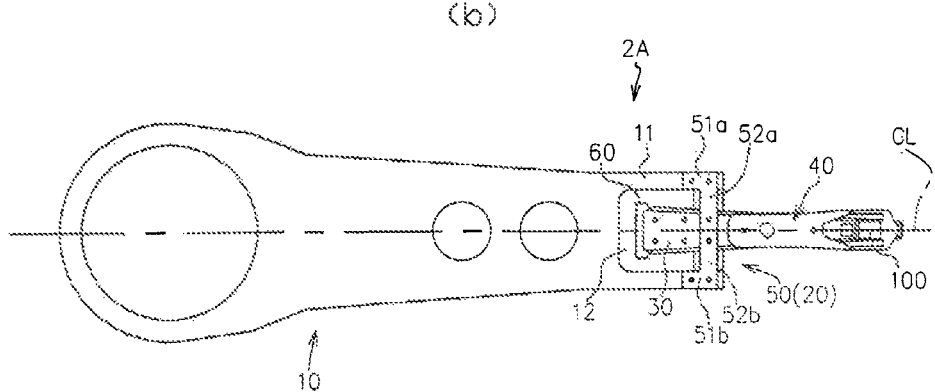
Figure 19:
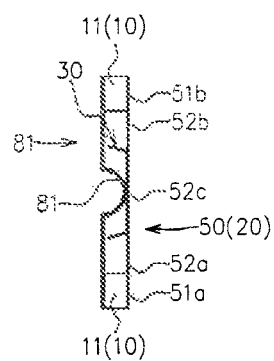

As illustrated in FIG. 19 and FIG. 20, the magnetic head suspension 2A includes a restraint plate 80 connected to the supporting portion 10 and positioned on a side of the member forming the load beam portion 30 opposite from the elastic plate 50 so that the member forming the load beam portion 30 is sandwiched between the restraint plate 80 and the elastic plate 50 in the direction orthogonal to the disk surface, in addition to the structure of the magnetic head suspension 1A according to the first embodiment.

The restraint plate 80 has a protrusion portion 81 which contacts with the member forming the load beam portion 30 on the load bending center line BL, as illustrated in FIGS. 19A and 19C.

In the present embodiment, as illustrated in FIG. 19, the elastic plate 50 is connected to the lower surface of the supporting portion 10 and, also, the member forming the load beam portion 30 is connected to the upper surface of the elastic plate 50.

Accordingly, the restraint plate 80 is connected to the upper surface of the supporting portion 10 such that the protrusion portion 81 is protruded in the downward direction (the direction in which it comes close to the disk surface).

The magnetic head suspension 2A including the restraint plate 80 according to the second embodiment can effectively prevent the supporting portion of the load beam portion 30 (namely, the portion of the load beam portion 30 which is connected to the elastic plate 50) from moving in the direction orthogonal to the disk surface when an external impulsive force is applied thereto, which can offer the advantage of raising the critical acceleration of the impulsive force which triggers the jump of the magnetic head slider 100, in addition to the advantages of the first embodiment.

Figure 21:
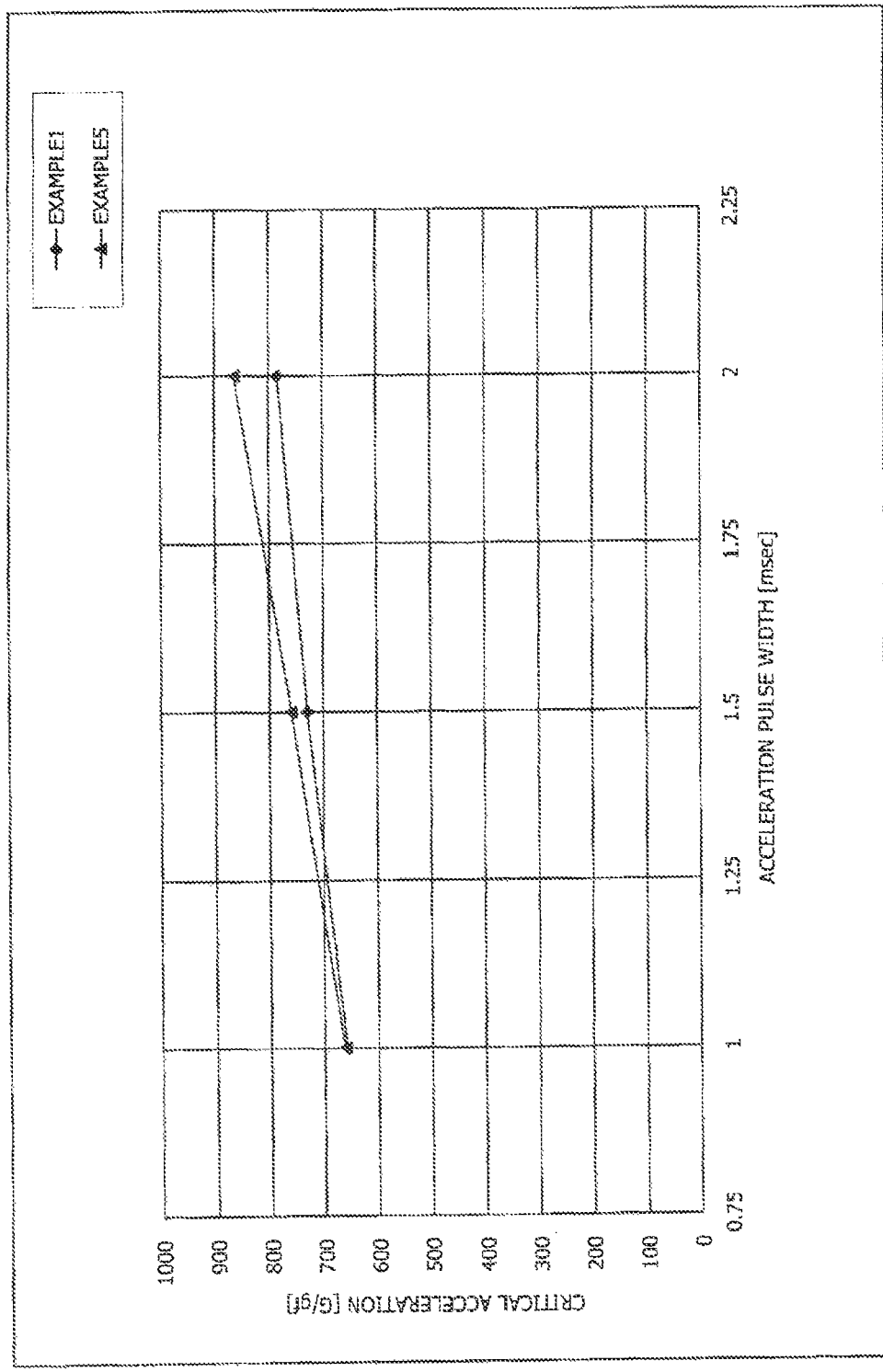
FIG. 21 is a graph showing the results of analyses of the critical accelerations in an example (the example 1) of the magnetic head suspension according to the first embodiment and an example (example 5) of the magnetic head suspension according to the second embodiment, which are resulted from the application of impulsive waves having pulse widths of 1.00 msec, 1.50 msec and 2.00 msec thereto, on the basis of a finite-element method.

FIG. 21 illustrates the results of analyses of the critical accelerations in an example (the example 1) of the magnetic head suspension 1A according to the first embodiment illustrated in FIG. 1 and an example (hereinafter, referred to as an example 5) of the magnetic head suspension 2A according to the second embodiment illustrated in FIG. 19, which were resulted from the application of impulsive waves (half-sine wave accelerations) having pulse widths of 1.00 msec, 1.50 msec and 2.00 msec thereto, on the basis of a finite-element method.

In the example 5, the restraint plate 80 was formed to have a thickness of 0.045 mm, but the other conditions were the same as those of the example 1.

As is apparent from FIG. 21, it is revealed that, when impulsive waves having acceleration pulse widths of 1.5 msec and 2.0 msec are applied thereto, the critical acceleration in the example 5 having the restraint plate 80 is higher by about 20 G/gf to 90 G/gf than that in the example 1 having no restraint plate 80.

Further, in the present embodiment, as illustrated in FIG. 19, the restraint plate 80 has the single protrusion portion 81. In this structure, the protruding portion 81 is brought into contact with the load beam portion 30 at the intersection point between the load bending center line BL and the longitudinal center line CL (see FIG. 19A).

Instead of this structure, the restraint plate 80 can have a plurality of protrusion portions 81. In the case where the restraint plate 80 has a plurality of protrusion portions 81 as described above, these plurality of protrusion portions 81 are positioned along the load bending center line BL and are placed to be symmetrical with the longitudinal center line CL as a reference.

Also, the protrusion portion 81 can be configured to be contacted with the load beam portion 30 in a line-to-line manner, instead of being configured to be contacted with the load beam portion 30 in a point-to-point manner, as illustrated in FIG. 19.

Figure 22:
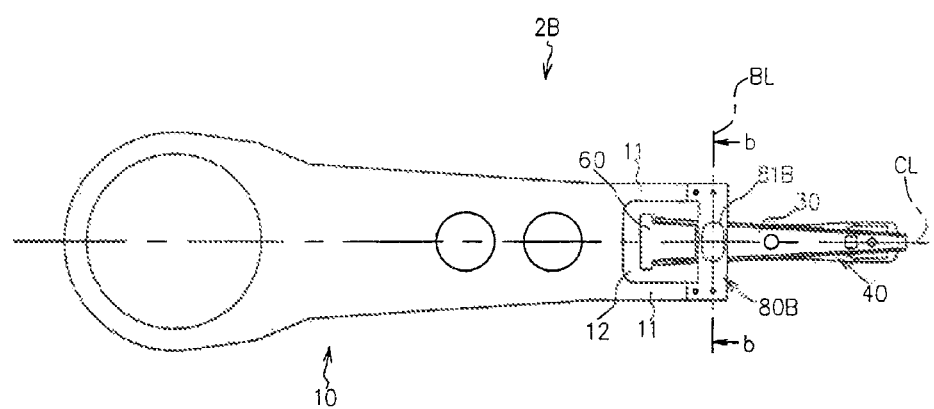
FIGS. 22A and 22B are a top view of a magnetic head suspension modified from the second embodiment and a cross-sectional view taken along the line b-b in FIG. 22A, respectively.
Figure 22:
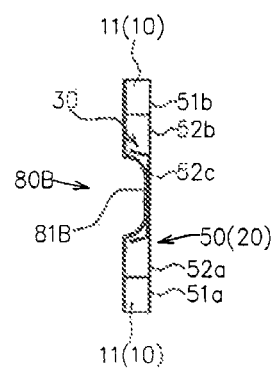

FIG. 22 illustrates an exemplary magnetic head suspension 2B including a restraint plate 81B having a protrusion portion 81B configured to be contacted with the load beam portion 30 in a line-to-line manner. FIGS. 22A and 22B illustrate a top view of the magnetic head suspension 2B and a cross-sectional view taken along the line b-b in FIG. 22A, respectively.

As illustrated in FIG. 22, the restraint plate 80B has the single protrusion portion 81B.

The single protrusion portion 81B is contacted with the load beam portion 30 over a predetermined distance in the widthwise direction of the magnetic head suspension, at a state where it is placed along the load bending center line BL and is placed to be symmetrical with the longitudinal center line CL as a reference.

With this structure, similarly, it is possible to effectively prevent the supporting point of the load beam portion 30 from varying in the direction orthogonal to the disk surface when an impulsive force is applied thereto. Further, it is also possible to increase the resonance frequency, particularly the Torsion-mode frequency (the resonance frequency in a mode at which the magnetic head slider 100 vibrates in the seek direction due to the twist of the load beam portion 30).

Instead of the structures, it is also possible to provide a restraint plate 80C structured to be contacted with the load beam portion 30 in a surface-to-surface manner.

Figure 23:
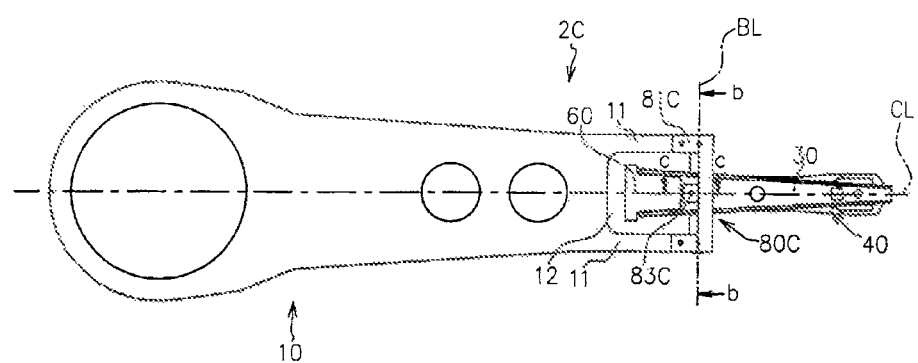
FIGS. 23A to 23C are a top view of a magnetic head suspension modified from the second embodiment, a cross-sectional view taken along the line b-b in FIG. 23A and a cross-sectional view taken along the line c-c in FIG. 23A, respectively.
Figure 23:
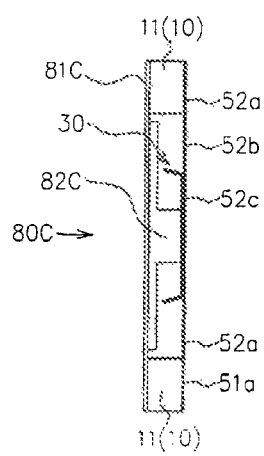
Figure 23:
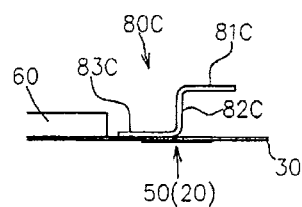

FIG. 23 illustrates a magnetic head suspension 2C including the restraint plate 80C. FIGS. 23A to 23C are a top view of the magnetic head suspension 2C, a cross-sectional view taken along the line b-b in FIG. 23A and a cross-sectional view taken along the line c-c in FIG. 23A.

The restraint plate 80C is connected to the supporting plate 10 and positioned on a side of the member forming the load beam portion 30 opposite from the elastic plate 50 in the direction orthogonal to the disk surface so that the member forming the load beam portion 30 is sandwiched between the restraint plate 80C and the elastic plate 50, similarly to the restraint plates 80, 80B in FIGS. 19 and 22.

In the illustrated embodiment, the elastic plate 50 is connected to the lower surface of the supporting portion 10 and, also, the load beam portion 30 is connected to the upper surface of the elastic plate 50. Accordingly, the restraint plate 80C is connected to the upper surface of the supporting portion 10.

More specifically, as illustrated in FIG. 23, the restraint plate 80C includes a connected surface 81 connected to the upper surface (the surface opposite from the disk surface) of the supporting portion 10, a coupling surface 82C folded in such a direction that it comes close to the disk surface from the connected surface 81C, and a contact surface 83C which is folded from the free-end side of the coupled surface 82C and is connected to the upper surface (the surface opposite from the disk surface) of the member forming the load beam portion 30 in a surface-to-surface manner.

A border line between the coupling surface 82C and the contact surface 83C is positioned on the load bending center line BL and also is symmetrical with the longitudinal center line CL as a reference.

With this structure, it is also possible to effectively prevent the supporting point of the load beam portion 30 from varying in the direction orthogonal to the disk surface when an impulsive force is applied thereto.

Third Embodiment

Hereinafter, still another embodiment of the magnetic head suspension according to the present invention will be described, with reference to the attached drawings.

FIGS. 24A to 24C illustrate a top view of the magnetic head suspension 3A according to the third embodiment, a bottom view of the same, and a cross-sectional view taken along the line c-c in FIG. 24A.

Further, in the drawings, the same components as those of the first and second embodiments are designated by the same reference characters and will not be described in detail.

Figure 24:
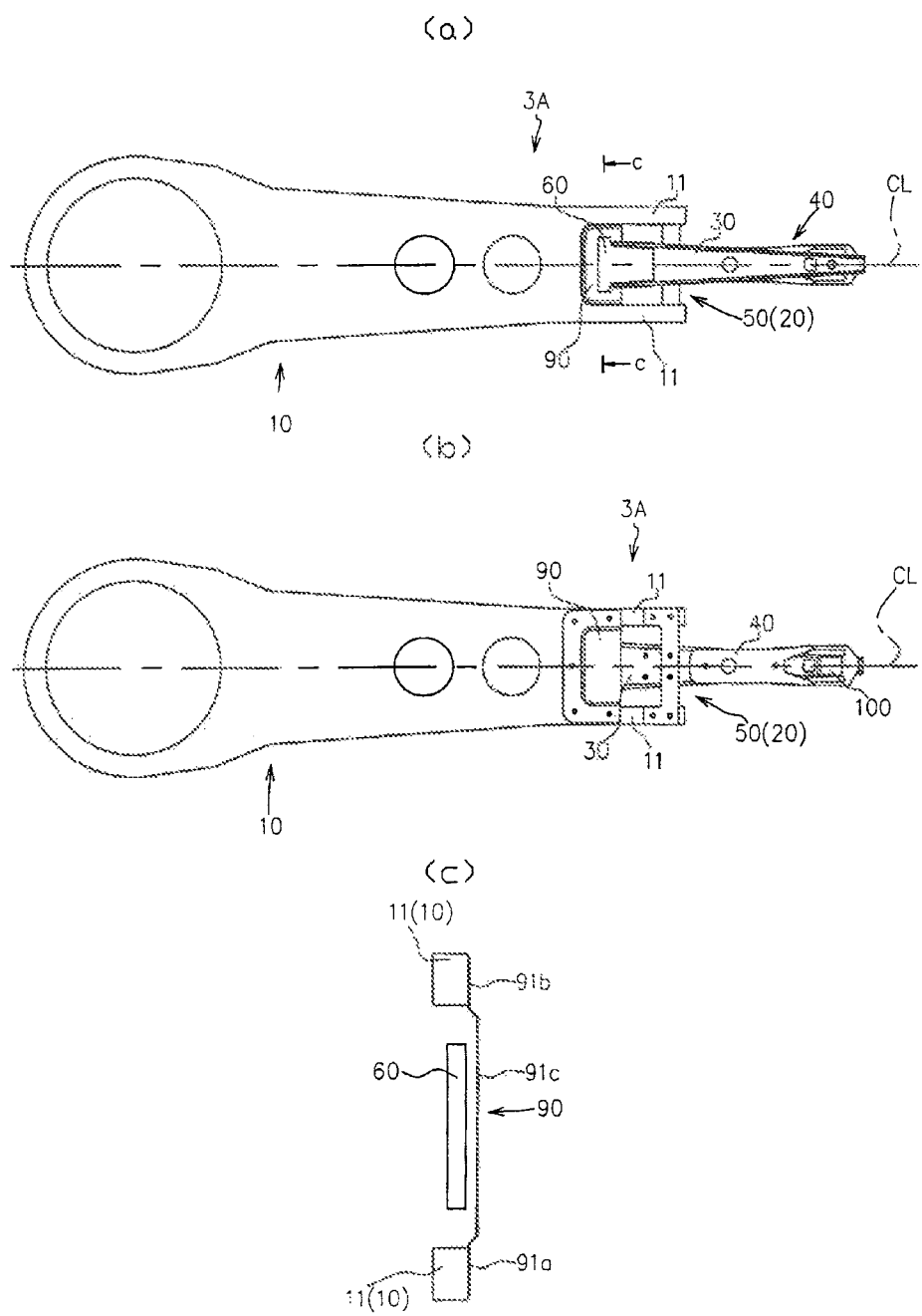
FIGS. 24A to 24C are a top view of a magnetic head suspension according to a third embodiment of the present invention, a bottom view thereof, and a cross-sectional view taken along the line c-c in FIG. 24A, respectively.

As illustrated in FIG. 24, the magnetic head suspension 3A includes a restriction plate 90 connected to the supporting portion 10 such that it is positioned on a side closer to the disk surface than the base-end side area of the load beam 30, in addition to the structure of the magnetic head suspension 1A according to the first embodiment.

The restriction plate 90 is placed to overlap with at least a portion of the balance mass member 60 in a plan view.

By providing the restriction plate 90, it is possible to effectively prevent the balance mass member 90, which has been jumped in such a direction that it separates from the disk surface when an impact is applied the suspension, from swinging back toward the disk surface and impinging on the disk surface. Further, even if an external impulsive force is applied to the balance mass member 60 in such a direction as to cause the balance mass member 60 to come close to the disk surface, it is possible to effectively prevent the balance mass member from impinging on the disk surface.

As illustrated in FIG. 24C, the restriction plate 90 is connected to the supporting portion 10 such that there is a predetermined interval (for example, 0.1 mm to 0.2 mm) between the restriction plate 90 and the balance mass member 60, at a normal state where no impact is applied thereto.

More specifically, the restriction plate 90 includes a first and second connected areas 91a and 91b connected to the lower surfaces of the pair of supporting pieces 11, and a cover area 91c extending between the first and second connected areas 91a and 91b such that it overlaps with at least a portion of the balance mass member 60 in a plan view.

Further, the cover area 91c is positioned more proximally to the disk surface than the plane in which there exists the lower surface of the supporting portion 10, such that there is the predetermined interval between the cover area 91c and the lower surface of the balance mass member 60.

The restriction plate 90 can be preferably formed from a stainless-steel plate with a thickness in the range of about 0.02 mm to 0.1 mm, for example.

While, in the present embodiment, there has been described a case where the restriction plate 90 is provided in the magnetic head suspension 1A according to the first embodiment, the restriction plate 90 can also be provided in the magnetic head suspension 2A according to the second embodiment, as a matter of cause.

Fourth Embodiment

Hereinafter, still another embodiment of the magnetic head suspension according to the present invention will be described, with reference to the attached drawings.

Figure 25:
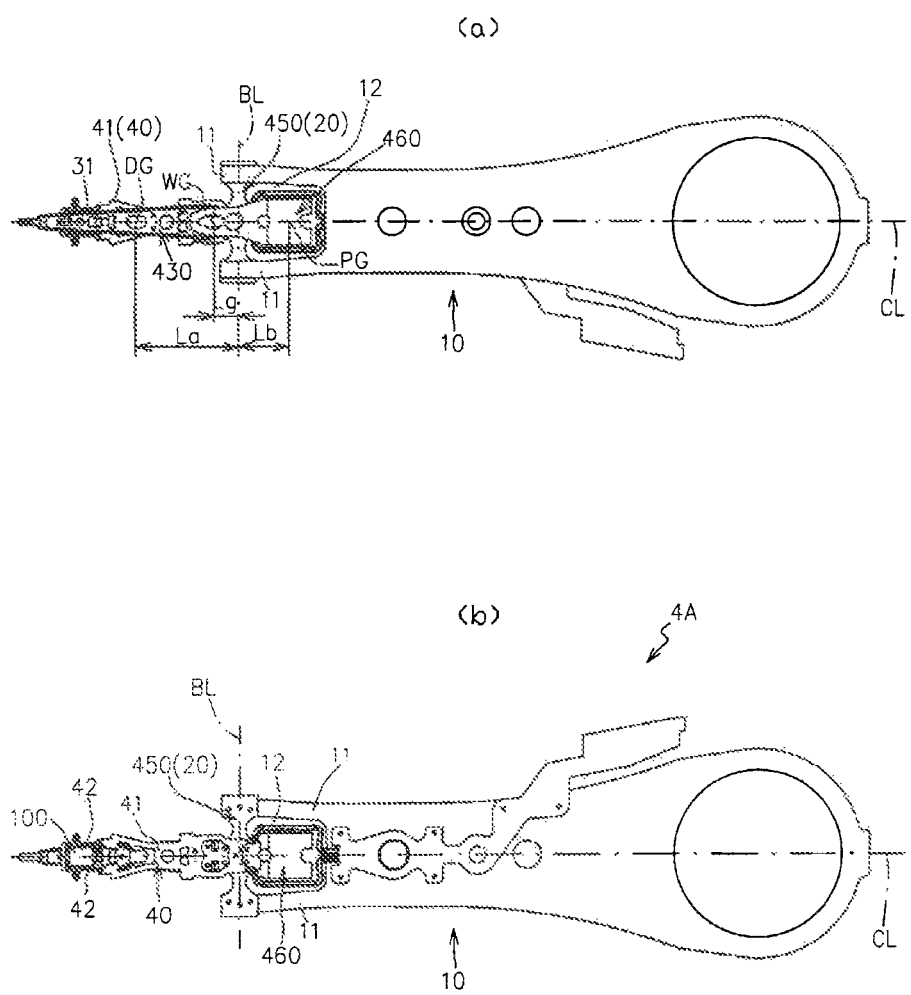
FIGS. 25A and 25B are a top view and a bottom view of a magnetic head suspension according to a fourth embodiment of the present invention, respectively.

FIGS. 25A and 25B illustrate a top view and a bottom view of the magnetic head suspension 4A according to the present embodiment, respectively.

Figure 26:
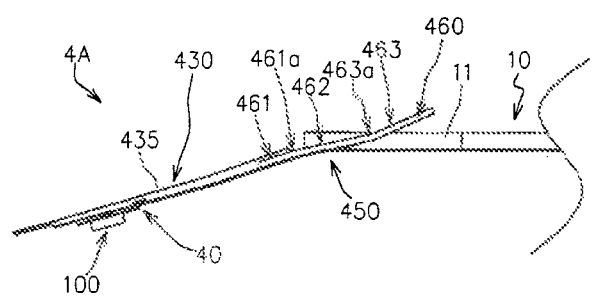
FIGS. 26A and 26B are partial side views of the magnetic head suspension according to the fourth embodiment in a state before it is mounted to a data storage device and in a state where it is operated after being mounted to the data storage device, respectively.
Figure 26:
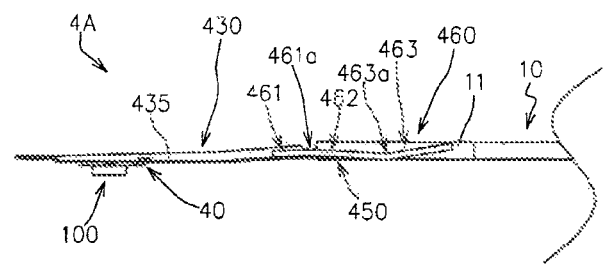

Further, FIG. 26 illustrates a partial side view of the magnetic head suspension 4A. FIGS. 26A and 26B illustrate the magnetic head suspension 4A in a state before it is mounted to a data storage device and in a state where it is operated after being mounted to the data storage device, respectively.

Figure 27:
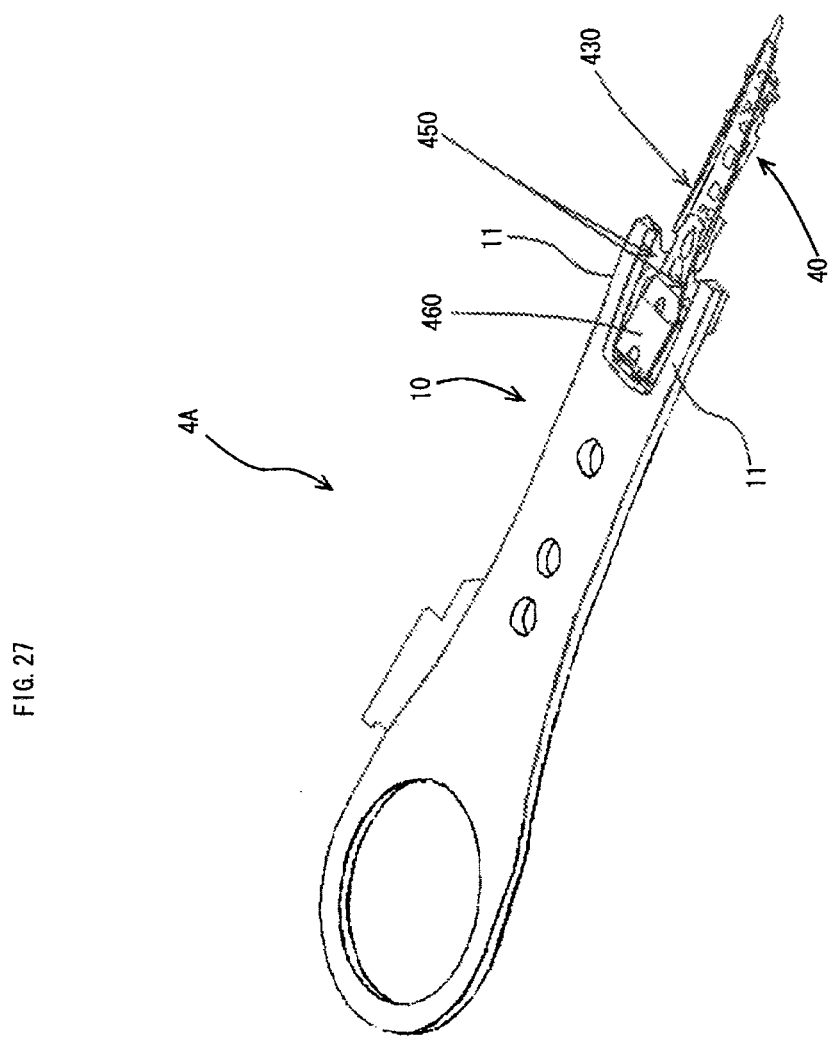
FIG. 27 is a perspective view of the magnetic head suspension according to the fourth embodiment before being mounted to the data storage device.
Figure 28:
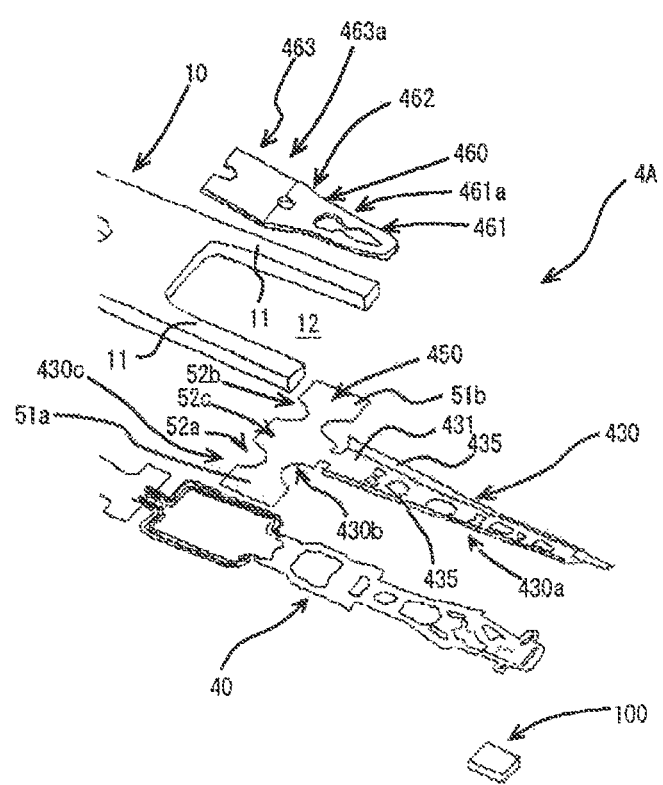
FIG. 28 is an exploded perspective view of the magnetic head suspension according to the fourth embodiment before being mounted to the data storage device.

Further, FIG. 27 and FIG. 28 illustrate, respectively, a perspective view and an exploded perspective view illustrating, from above, in a state before it is mounted to the data storage device.

Further, in the drawings, the same components as those of the first to third embodiments are designated by the same reference characters and will not be described in detail.

As illustrated in FIGS. 25 to 28, the magnetic head suspension 4A according to the present embodiment includes a balance mass member 460, a load beam portion 430 and an elastic plate 450, instead of the balance mass member 60, the load beam portion 30 and the elastic plate 50 in the magnetic head suspension 1A according to the first embodiment.

FIGS. 29A and 29B illustrate, respectively, a top view and a bottom view of the balance mass member 460.

As illustrated in FIGS. 25 to 29, the balance mass member 460 includes a tip end portion 461 connected to the base-end portion of the load beam portion 430, a base-end portion 463 extending toward the base-end side of the suspension within the concave portion 12 beyond the elastic plate 450, and a center portion 462 positioned between the tip end portion 461 and the base-end portion 463 and connected to the elastic plate 450.

Figure 29:
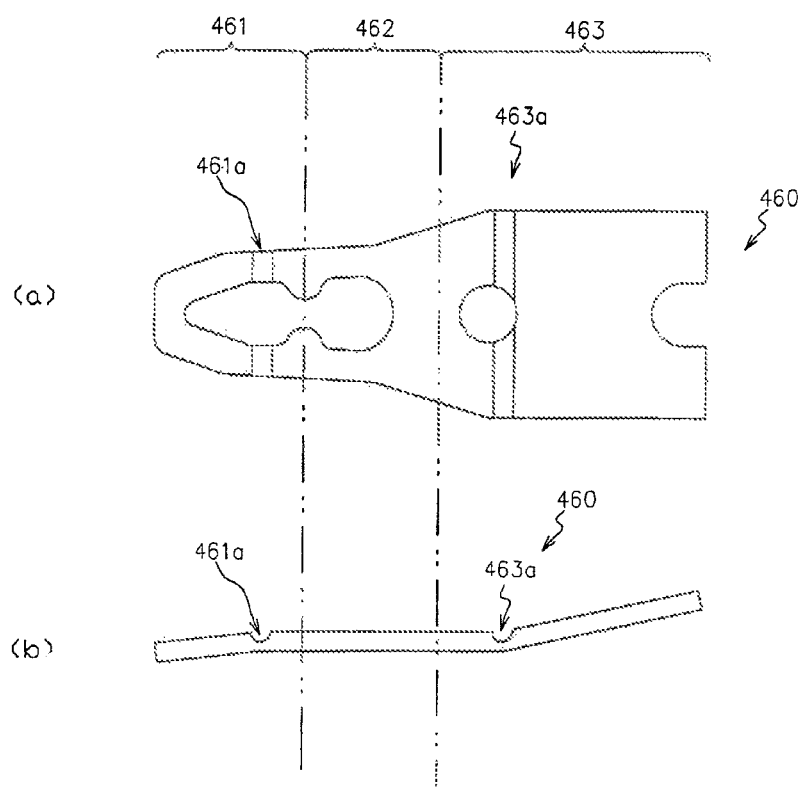
FIGS. 29A and 29B are, respectively, a top view and a bottom view of a balance mass member of the magnetic head suspension according to the fourth embodiment.

That is, as illustrated in FIG. 29, the balance mass member 460 includes the center portion 462 connected to the elastic plate 450, the tip end portion 461 which is extended toward the tip-end side of the suspension from the center portion 462 and is connected to the load beam portion 430, and the base-end portion 463 extending from the center portion 462 toward the base-end side of the suspension, in the longitudinal direction of the magnetic head suspension 4A.

Preferably, as illustrated in FIG. 29, the balance mass member 460 is configured such that its base-end portion 463 has a base-end-side bending portion 463a and its portion extending from the base-end-side bending portion 463a up to the base-end edge is gradually separated from the disk surface with decreasing distance to the base end.

With this structure, when an impact is applied thereto, it is possible to effectively prevent the balance mass member 460 jumped in such a direction that it separates from the disk surface from impinging on the disk surface during swaying back toward the disk surface. Further, even if an external impulsive force is applied to the balance mass member 460 in such a direction that it comes close to the disk surface, it is possible to effectively prevent the balance mass member 460 from impinging on the disk surface.

At the base-end-side bending portion 463a, for example, a groove with a depth equal to ½ to ¾ of the thickness of the balance mass member can be formed in the widthwise direction, as illustrated in FIG. 29. By forming this groove, it is possible to easily perform the processing for bending the balance mass member 460 at the base-end-side bending portion 463a.

The groove can be formed, with preferable controllability, by etching the portion of the balance mass member 460 corresponding to the base-end-side bending portion 463a from a single side thereof.

Similarly to the first embodiment, it is preferable that there is the relationship of $0 \leq Lg \leq 0.45 \times La$, more preferably $0 \leq Lg \leq 0.3 \times La$ and, more preferably $0 \leq Lg \leq 0.2 \times La$ in the magnetic head suspension 4A including the balance mass member 460, wherein Lg is the length in the longitudinal direction of the magnetic head suspension between the center of gravity WG of the assembly constituted by the load beam portion 430, the flexure portion 40 and the balance mass member 460 and the load bending center line BL of the first and second extending portions 52a and 52b along the widthwise direction of the magnetic head suspension and, also, La is the length in the longitudinal direction of the magnetic head suspension between the load bending center line BL and the center of gravity DG of the portion of the aforementioned assembly which is closer to the tip end than the load bending center line BL.

Figure 30:
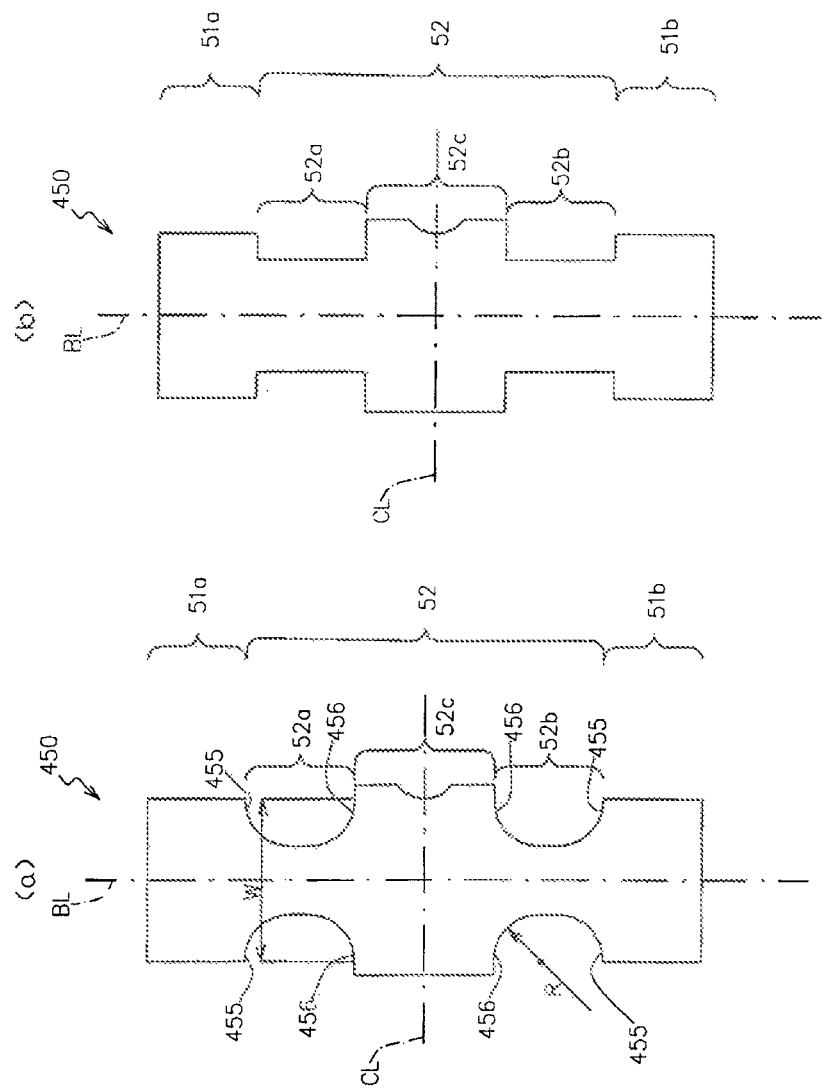
FIG. 30A is a plan view of an elastic plate of the magnetic head suspension according to the fourth embodiment.
FIG. 30B is a plan view of an exemplary modification of the elastic plate.

FIG. 30A illustrates a plan view of the elastic plate 450.

The elastic plate 450 has a first and second connected areas 51a and 51b which are connected to the pair of supporting pieces 11, and a center area 52 extending between the first and second connected areas 51a and 51b as illustrated in FIG. 30A, similarly to in the first embodiment.

The center area 52 has a center connected portion 52c which is positioned at the center in the widthwise direction of the magnetic head suspension 4A, a first extending portion 52a extending between the center connected portion 52c and the first connected area 51a, and a second extending portion 52b extending between the center connected portion 52c and the second connected area 51b.

The first and second extending portion 52a and 52b are shaped to be symmetrical to each other with the longitudinal center line CL of the magnetic head suspension 4A as a reference, similarly to in the embodiments.

Further, the first and second extending portions 52a and 52b are shaped to be symmetrical with the load bending center line BL as a reference.

In the present embodiment, the elastic plate 450 is connected to the balance mass member 460, as described above. More specifically, the center connected portion 52c is connected to the center portion 462 of the balance mass member 460.

The first and second extending portions 52a and 52b are twisted such that the tip end side of the load beam portion 430 comes close to the disk surface in a state before the magnetic head suspension 4A according to the present embodiment is mounted to a data storage device (see FIG. 26A) and, further, the first and second extending, portions 52a and 52b are twisted back in a state where the magnetic head suspension 4A is operated after being mounted to the data storage device (see FIG. 26B), similarly to the magnetic head suspension 1A.

In the magnetic head suspension 4A with the aforementioned structure, the elastic plate 450 supported at its opposite ends functions as the load bending portion 20, similarly to in aforementioned respective embodiments.

Accordingly, when an external impulsive force is applied thereto, it is possible to effectively prevent the supporting point of the load beam portion 430 (namely, the portion of the load beam portion 430 which is connected to the elastic member 450) from varying in the direction orthogonal to the disk surface, thus suppressing the jump of the magnetic head slider 100 and largely raising the acceleration limit of the impulsive force which triggers the jump of the magnetic head slider 100.

Preferably, as illustrated in FIG. 30A, each of the first and second extending portions 52a and 52b has outer curved portions 455 having a width gradually increased with decreasing distance to the corresponding connected area 51a, 51b, and inner curved portions 456 having a width gradually increased with decreasing distance to the center connected portion 52c, at its tip-end side and base-end side.

This structure allows the first and second extending portions 52a and 52b to perform the twist action in a stable manner, thus reducing the variation of the spring constant of the elastic plate 450, in comparison with the structure having the rectangular-shaped first and second extending portions 52a and 52b (see FIG. 30B).

In the present embodiment, as illustrated in FIG. 30A, the outer curved portions 455 and the inner curved portions 456 are both formed to have an arc shape.

In this structure, preferably, the radius R of the outer curved portions 455 and the inner curved portions 456 is set to within the range of ¼×W to ⅓×W, assuming that the width between the opposite end portions of the first and second extending portions 52a and 52b is W.

Instead of this structure, the outer curved portions 455 and the inner curved portions 456 of the respective extending portions 52a and 52b at their tip-end side and/or base-end side are formed to have a single elliptical shape.

In the present embodiment, the load beam portion 430 is positioned more proximally to the tip-end side of the suspension than the elastic plate 450. That is, the load beam portion 430 has a base-end portion terminated at a position closer to the tip-end side of the suspension than the elastic plate 450.

In this structure, preferably, the load beam portion 430 and the elastic plate 450 are integrally formed from a single member as illustrated in FIG. 28.

This structure can reduce the number of members and the number of assembling processes, thereby reducing the cost, and also can improve the assembling accuracy.

More specifically, as illustrated in FIG. 28, the member forming the load beam portion 430 includes a flange area 430a having a center flat-plate portion 431 positioned at the center in the widthwise direction of the suspension and a pair of flange portions 435 provided at the opposite sides of the center flat-plate portion 431 in the widthwise direction, an elastic-plate area 430c forming the elastic plate 450, and a flat-plate shaped coupling area 430b which couples the center flat-plate portion 431 of the flange area 430a to the tip-end edge of the center connected portion 52c of the elastic plate 450, wherein these portions are integrally formed.

By coupling the flange area 430a and the elastic-plate forming area 430c to each other through the flat-plate shaped coupling area 430b as described above, it is possible to easily form the load beam portion 430 having the flange portion 430 and the elastic plate 450 from a single member.

The coupling area 430b is formed to have a flat-plate shape as described above and therefore has rigidity lower than that of the flange area 430a.

To cope with this point, in the present embodiment, as illustrated in FIG. 27, the tip-end portion 461 of the balance mass member 460 is connected to the center flat-plate portion 431, at a state where the tip-end portion 461 of the balance mass member 460 is interposed between the pair of flange portions 435.

That is, in the present embodiment, the balance mass member 460 also functions as a reinforcing member which reinforces the rigidity of the coupling area 430b.

Further, since the flange area 430a and the elastic-plate area 430c are coupled to each other through the flat-plate shaped coupling area 430b and, also, the tip-end portion 461 of the balance mass member 460 is connected to the center flat-plate portion 431 with the tip-end portion 461 interposed between the pair of flange portions 435, it is possible to easily perform the process for bending the magnetic head suspension 4A at the coupling area 430b, thereby facilitating the operations for adjusting the position of the center line of the twisting mode of the magnetic head suspension 4A with respect to the apex of the dimple 31.

That is, even in the event of the occurrence of vibrations of the magnetic head suspension 4A in a twisting mode, when the center line of the vibrations in the twisting mode passes through the apex of the dimple 31, it is possible to effectively prevent the deviation of the position of the magnetic head slider 100 due to the vibrations in the aforementioned twisting mode.

The positioning of the center line of the twisting mode can be performed by applying a bending process to the load beam portion 430 and the balance mass member 460 at a position closer to the tip-end side of the suspension than the load bending portion 20.

To cope with this point, in the present embodiment, the flange area 430a and the elastic-plate area 430c are coupled to each other through the flat-plate shaped coupling area 430b, as described above. This enables performing the process for bending the magnetic head suspension 4A at the coupling area 430b which does not have the flange portion 435, thereby enabling the bending process with higher accuracy.

More preferably, as illustrated in FIG. 28, the coupling area 430b is formed to have a width smaller than that of the base-end portion of the flange area 430a.

With this structure, it is possible to perform more easily the aforementioned bending process on the coupling area 430b.

More preferably, as illustrated in FIG. 29, the balance mass member 460 has a tip-end-side bending portion 461a at the portion of the tip-end portion 461 which corresponds to the coupling area 430b.

The tip-end-side bending portion 461a is structured to have a thickness smaller than those of the other areas.

With this structure, it is possible to easily perform the bending process on the balance mass member 460 and the load beam portion 430 at the coupling area 430b, at a state where the balance mass member 460 is connected to the load beam portion 430.

The tip-end-side bending portion 461a can be formed to be a groove having a depth equal to ½ to ¾ of the thickness of the aforementioned balance mass member along the widthwise direction, for example, as illustrated in FIG. 29.

The groove can be formed, with preferable controllability, by etching the portion of the balance mass member 460 corresponding to the tip-end-side bending portion 461a from a single side thereof.

Fifth Embodiment

Hereinafter, still another embodiment of the magnetic head suspension according to the present invention will be described, with reference to the attached drawings.

Figure 31:
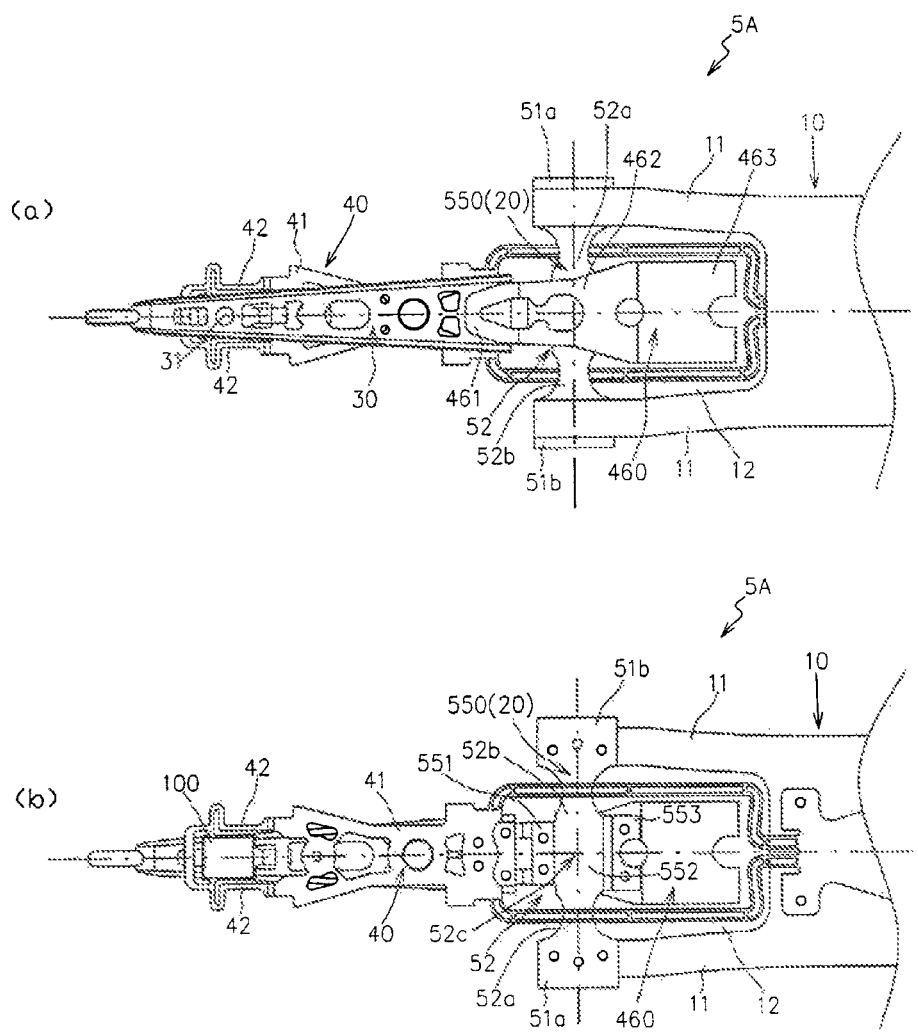
FIGS. 31A and 31B are a top view and a bottom view of a magnetic head suspension according to a fifth embodiment of the present invention, respectively.

FIGS. 31A and 31B illustrate a top view and a bottom view of the magnetic head suspension 5A according to the present embodiment, respectively.

Figure 32:
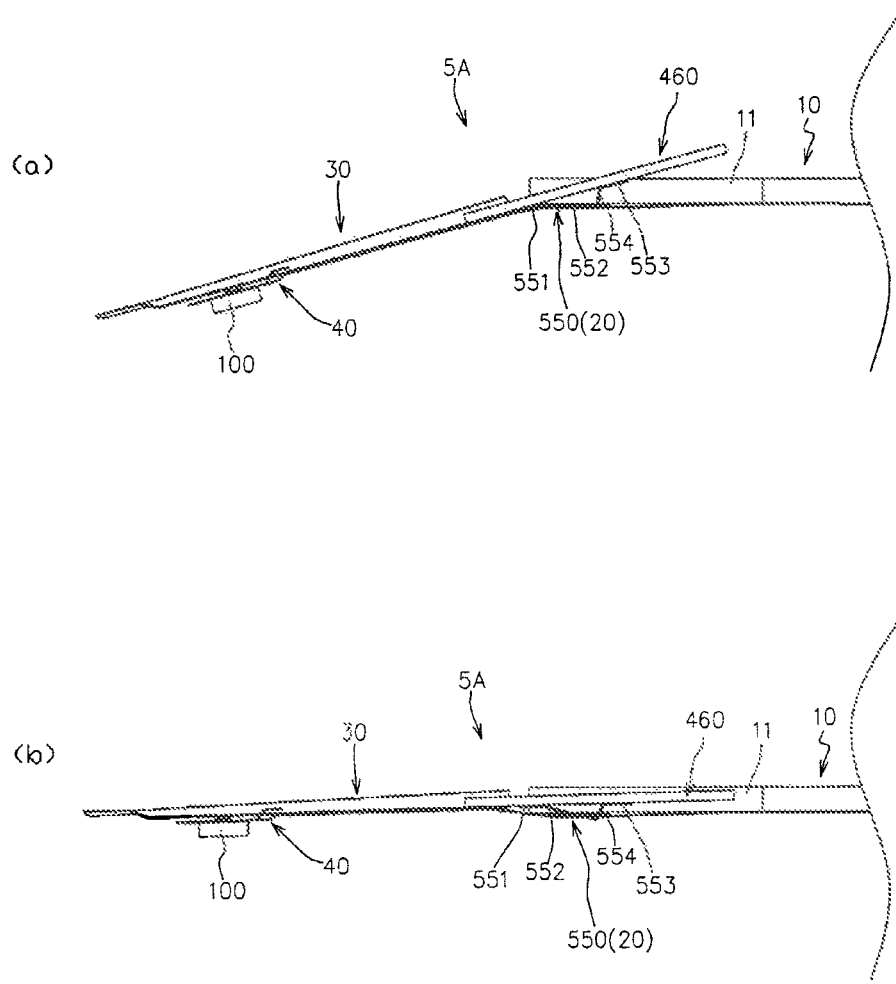
FIGS. 32A and 32B are partial side views of the magnetic head suspension according to the fifth embodiment in a state before it is mounted to a data storage device and in a state where it is operated after being mounted to the data storage device, respectively.

Further, FIG. 32 illustrates a partial side view of the magnetic head suspension 5A. FIGS. 32A and 32B illustrate the magnetic head suspension 5A in a state before it is mounted to a data storage device and in a state where it is operated after being mounted to the data storage device.

Figure 33:
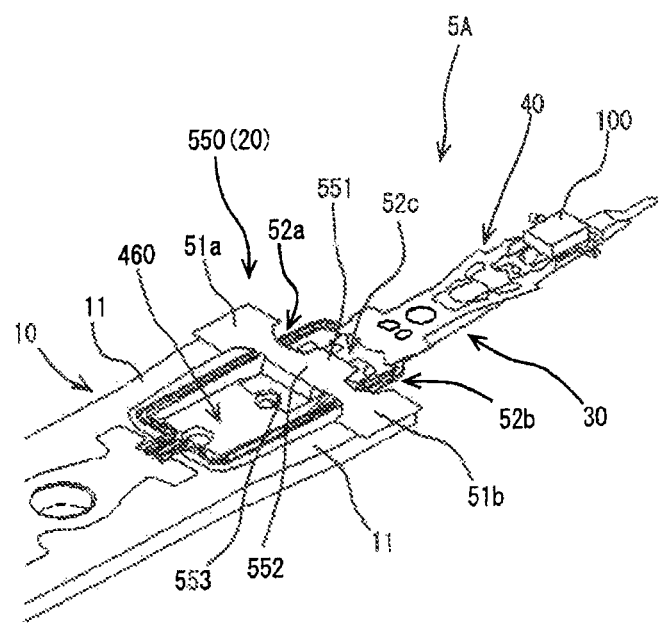
FIG. 33 is a perspective view shown from the disk-surface side of the magnetic head suspension according to the fifth embodiment in a state where it is operated after being mounted to the data storage device.

Further, FIG. 33 illustrates a perspective view illustrating the magnetic head suspension 5A in a state where it is operated after being mounted to the data storage device, from the disk-surface side.

Further, in the drawings, the same components as those of the first to fourth embodiment are designated by the same reference characters and will not be described in detail.

The magnetic head suspension 5A according to the present embodiment includes an elastic plate 550, instead of the elastic plate 450 in the magnetic head suspension 4A according to the fourth embodiment.

Figure 34:
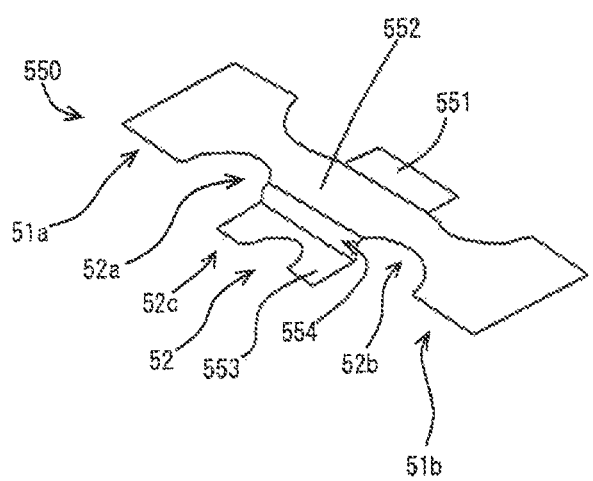
FIG. 34 is a perspective view shown from the disk-surface side of the elastic plate of the magnetic head suspension according to the fifth embodiment.

FIG. 34 illustrates a perspective view illustrating the elastic plate 550, from the disk-surface side.

The elastic plate 550 includes the first and second connected areas which are connected to the pair of supporting pieces 11, and a center area 52 extending between the first and second connected areas 51a and 51b. The center area 52 includes the center connected portion 52c which is connected to the balance mass member 460, the first extending portion 52a extending between the center connected portion 52c and the first connected area 51a, and the second extending portion 52b extending between the center connected portion 52c and the second connected area 51b.

The elastic plate 550 is different from the elastic plates 50 and 450 according to the respective embodiments, in that the center connected portion 52c has the following structures.

That is, in the present embodiment, as illustrated in FIG. 34, the center connected portion 52c includes a tip-end-side flat-surface portion 551 which is positioned on a tip-end side and is connected to the center portion 462 of the balance mass member 460 at an attitude parallel to the center portion 462, a center flat-surface portion 552 which is extended from the tip-end-side flat-surface portion 551 toward the base-end side of the suspension and which is inclined with respect to the tip-end-side flat-surface portion 551 such that it gradually separates from the center portion 462 of the balance mass member 460 with increasing distance from the tip-end side toward the base-end side and to which the first and second extending portions 52a and 52b are connected, and a base-end-side flat-surface portion 553 which is extended toward the base-end side of the suspension from the center flat-surface portion 552 with a bending portion 554 interposed therebetween and is connected to the center portion 462 of the balance mass member 460 at an attitude parallel to the center portion 462.

The elastic plate 550 is structured such that, in a state before the magnetic head suspension 5A is mounted to a data storage device, the center flat-surface portion 552 is positioned within the same plane as the plane in which there exist the first and second extending portions 52a and 52b and the first and second connected areas 51a and 51b and, in a state where the magnetic head suspension 5A is operated after being mounted to the data storage device, the first and second extending portions 52a and 52b are twisted, thus generating the load.

With the magnetic head suspension 5A including the elastic plate 550 having the aforementioned structure, it is possible to generate the load in a state where it is operated after being mounted to the data storage device, without performing a process for twisting the elastic plate 550 before it is mounted to the data storage device. This can reduce the number of processes, thus reducing the cost, and also enables stably controlling the load.

That is, in the magnetic head suspension 4A according to the fourth embodiment, before it is mounted to a data storage device, the elastic plate 450 is subjected to a twisting process such that the tip-end side of the load beam portion 430 comes close to the disk surface and, also, in a state where it is operated, the elastic plate 450 is twisted back due to the air pressure, thereby generating the load.

On the contrary, in the magnetic head suspension 5A according to the present embodiment, in a state before it is mounted to a data storage device, the load beam 30 is inclined with respect to the supporting portion 10 by an angle corresponding to the angle of the inclination of the center flat-surface portion 552 with respect to the tip-end-side flat-surface portion 551 such that the tip-end side of the load beam portion 30 comes close to the disk surface, while the elastic plate 550 is not twisted, and, also, in a state where it is operated after being mounted to the data storage device, the tip-end side of the load beam portion 30 is pushed upwardly by the air pressure, which causes the first and second extending portions 52a and 52b to be twisted, thereby generating the load.

This can eliminate the process for twisting the elastic plate 550 and also can stabilize the load, in comparison with the structures in which the elastic plate is twisted back to generate the load.

Although, in the present embodiment, the elastic plate 550 is formed as a member separated from the load beam portion 30, the elastic plate 550 and the load beam portion 30 can be integrally formed from a single member, as in the fourth embodiment.

Further, although, in the present embodiment, there has been exemplified the structure which provides the elastic plate 550 in the magnetic head suspension 4A according to the fourth embodiment, the elastic plate 550 can also be applied to the magnetic head suspension 1A according to the first embodiment, as a matter of cause.

In the case where the elastic plate 550 is applied to the magnetic head suspension 1A according to the first embodiment, the tip-end-side flat-surface portion 551 is connected to the member forming the load beam portion 30 at an attitude parallel thereto, the center flat-surface portion 552 is inclined with respect to the tip-end-side flat-surface portion 551 such that it gradually separates from the member forming the load beam portion 30 with increasing distance from the tip-end side toward the base-end side, and the base-end-side flat-surface portion 553 is extended from the center flat-surface portion 552 toward the base-end side of the suspension through the bending portion 554 and is connected to the member forming the load beam portion 30.

Sixth Embodiment

Hereinafter, still another embodiment of the magnetic head suspension according to the present invention will be described, with reference to the attached drawings.

FIGS. 35A and 35B illustrate a top view and a bottom view of the magnetic head suspension 6A according to the embodiment, respectively.

Further, in the drawings, the same components as those of the first to fifth embodiments are designated by the same reference characters and will not be described in detail.

In the respective embodiments explained above, the pair of supporting pieces 11 have a constant width over the entire area in the longitudinal direction from the base-end side to the tip-end side.

Figure 35:
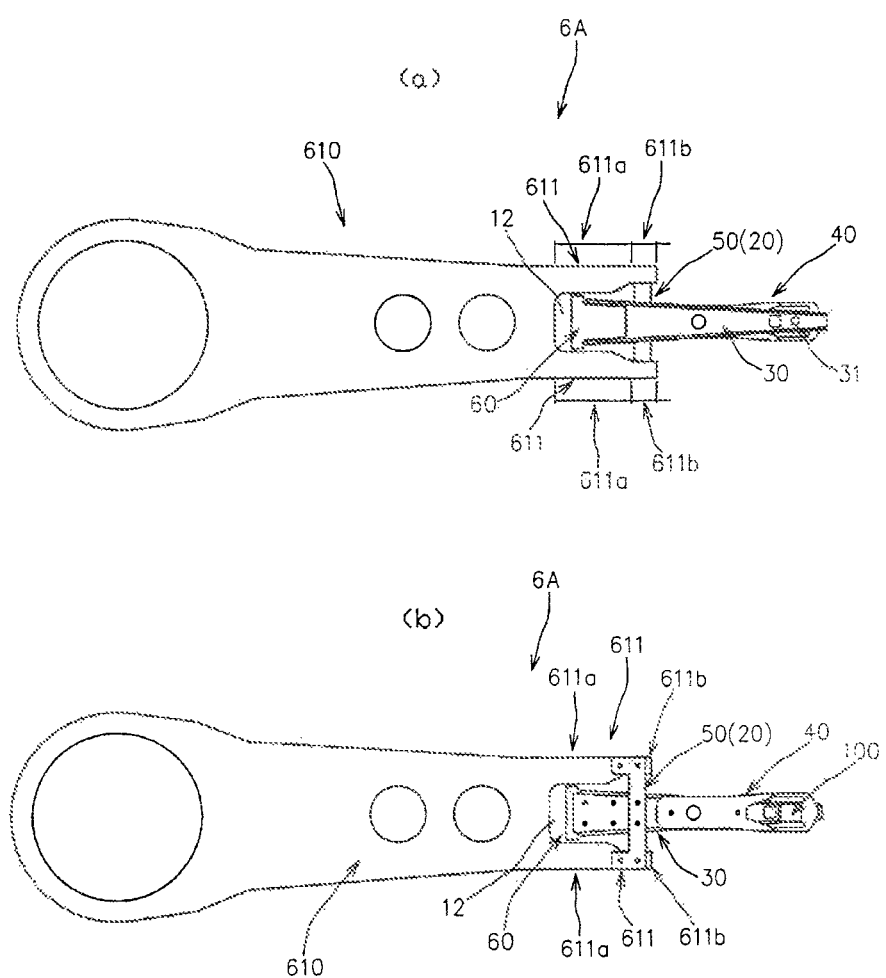
FIGS. 35A and 35B are a top view and a bottom view of a magnetic head suspension according to a sixth embodiment of the present invention, respectively.

On the contrary, as illustrated in FIG. 35, the magnetic head suspension 6A according to the present embodiment includes a pair of supporting pieces 611 having base-end portions 611a and tip-end portions 611b to which the elastic plate 50 is connected, wherein the base-end portions 611a have widths greater than those of the tip-end portions 611b.

That is, the magnetic head suspension 6A includes a supporting portion 610, instead of the supporting portion 10 in the magnetic head suspension 1A according to the first embodiment.

The supporting portion 610 includes the pair of supporting pieces 611 extending from its opposite sides in the widthwise direction of the magnetic head suspension 6A toward the tip-end side of the suspension, and a concave portion 12 which is defined by the pair of supporting pieces 611 to be opened toward the tip-end side of the suspension, as illustrated in FIG. 35.

Further, the pair of supporting pieces 611 includes the base-end portions 611a positioned on the base-end side of the suspension, and the tip-end portions 611b which are positioned more proximally to the tip-end side of the suspension than the base-end portion 611a and to which the elastic plate 50 is connected, wherein the base-end portions 611a have widths greater than those of the tip-end portions 611b.

With the magnetic head suspension 6A having the aforementioned structure, it is possible to raise the resonance frequency of the supporting portion 610 in the twisting mode, out of the vibration modes which can occur in the magnetic head suspension, thus improving the positioning accuracy in moving the magnetic head slider 100 to a desired track.

Further, although, in the present embodiment, there has been exemplified the structure which provides the pair of supporting pieces 611 in the magnetic head suspension 1A according to the first embodiment, the pair of supporting pieces 611 can also be applied to the magnetic head suspensions 2A to 5A according to the other embodiments, as a matter of cause.

This specification is by no means intended to restrict the present invention to the preferred embodiment and the modified embodiment set forth therein. Various modifications to the suspension for supporting the magnetic head slider may be made by those skilled in the art without departing from the spirit and scope of the present invention as defined in the appended claims.

What is claimed is:

1. A magnetic head suspension comprising:
 a load bending portion generating a load for pressing a magnetic head slider toward a disk surface, the load bending portion comprising an elastically-deformable elastic plate;
 a load beam portion transmitting the load to the magnetic head slider;
 a supporting portion supporting the load beam portion through the load bending portion and including a concave portion which is defined by a pair of supporting pieces extending from opposite sides of the supporting portion in the widthwise direction to a tip-end side of the suspension and which is opened toward the tip-end side of the suspension;
 a flexure portion connected to the load beam portion and supporting the magnetic head slider; and
 a balance mass member including a center portion which is connected to the elastic plate, a tip-end portion which is positioned on a tip-end side of the center portion in a longitudinal direction of the magnetic head suspension and which is connected to a base-end portion of the load beam portion, and a base-end portion of the balance mass member which is positioned on a base-end side of the center portion in the longitudinal direction of the magnetic head suspension, wherein the elastic plate has first and second ends in a widthwise direction of the suspension respectively connected to the pair of supporting pieces, wherein the elastic plate includes first and second connected areas which are respectively connected to the pair of supporting pieces, and a center area extending between the first and second connected areas, and wherein the center area includes a center connected portion to which the balance mass member is connected, a first extending portion extending between the center connected portion and the first connected area, and a second extending portion extending between the center connected portion and the second connected area, wherein each of the first and second extending portions has at both a tip-end side and a base-end side outer curved portions having a width gradually increased with decreasing distance to the corresponding connected area and inner curved portions having a width gradually increased with decreasing distance to the center connected portion.

2. A magnetic head suspension comprising:

a load bending portion generating a load for pressing a magnetic head slider toward a disk surface, the load bending portion comprising an elastically-deformable elastic plate;

a load beam portion transmitting the load to the magnetic head slider;

a supporting portion supporting the load beam portion through the load bending portion and including a concave portion which is defined b a pair of supporting pieces extending from opposite sides of the supporting portion in the widthwise direction to a tip-end side of the suspension and which is opened toward the tip end side of the suspension;

a flexure portion connected to the load beam portion and supporting the magnetic head slider; and a balance mass member including a center portion which is connected to the elastic plate, a tip-end portion which is positioned on a tip-end side of the center portion in a longitudinal direction, of the magnetic head suspension and which is connected to a base-end portion of the load beam portion, and a base-end portion of the balance mass member which is posit on a base-end side of the center portion in the longitudinal direction of the magnetic head suspension, wherein the elastic plate has first and second ends in a widthwise direction of the suspension respectively connected to the pair of supporting pieces, wherein the elastic plate includes first and second connected areas which are respectively connected to the pair of supporting pieces and a center area extending between the first and second connected areas, and wherein the center area includes a center connected portion to which the balance mass member is connected a first extending portion extending between the center connected portion and the first connected area and a second extending portion extending between the center connected portion and the second connected area, and wherein the load beam portion integrally includes:

a flange area having a center flat-plate portion positioned at the center in the widthwise direction of the suspension and a pair of flange portions provided at the opposite sides of the center flat-plate portion in the widthwise direction of the suspension;

an elastic-plate area forming the elastic plate; and a flat-plate shaped coupling area which couples the center flat-plate portion of the flange area to a tip-end edge of the center connected portion of the elastic plate.

3. The magnetic head suspension according to claim 2, wherein the tip-end portion of the balance mass member is connected to the center flat-plate portion of the load beam portion, at a state where the tip-end portion of the balance mass member is interposed between the pair of flange portions.

4. The magnetic head suspension according to claim 3, wherein the balance mass member has a tip-end-side bending portion at a portion corresponding to the coupling area.

5. The magnetic head suspension according to claim 4, wherein the coupling area has a width smaller than that of the base-end portion of the flange area.

6. The magnetic head suspension according to claim 4, wherein the bending portion has a thickness smaller than those of the other areas of the balance mass member.

7. A magnetic head suspension comprising:

a load bending portion generating a load for pressing a magnetic head slider toward a disk surface, the load bending portion comprising an elastically-deformable elastic plate;

a load beam portion transmitting the load to the magnetic head slider;

a supporting portion supporting the load beam portion through the load bending portion and including a concave portion which is defined by a pair of supporting pieces extending, from opposite sides of the supporting portion in the widthwise direction to a tip end side of the suspension and which is opened toward the tip-end side of the suspension;

a flexure portion connected to the load beam portion and supporting the magnetic head slider; and a balance mass member including a center portion which is connected to the elastic plate, a tip-end portion which is positioned on a tip-end side of the center portion in a longitudinal direction of the magnetic head suspension and which is connected to a base-end portion of the load beam portion, and a base-end portion of the balance mass member which is positioned on a base-end side of the center portion in the longitudinal direction of the magnetic head suspension, wherein the elastic plate has first and second ends in a widthwise direction of the suspension respectively connected to the pair of supporting pieces, wherein the elastic plate includes first and second connected areas which are respectively connected to the pair of supporting pieces, and a center area extending between the first and second connected areas, and wherein the center area includes a center connected portion to which the balance mass member is connected, a first extending portion extending between the center connected portion and the first connected area, and a second extending portion extending between the center connected portion and the second connected area, and wherein the balance mass member includes a base-end-side bending portion at the base-end portion, and is configured so that a portion extending from the base-end-side bending portion up to a base-end edge is gradually separated from the disk surface with decreasing distance to the base-end edge.

8. The magnetic head suspension according to claim 1, wherein a length Lg and a length La has a relationship of $0 \leqq Lg \leqq 0.3 \times La$, the length Lg being a length in the longitudinal direction of the magnetic head susper sion between a center of gravity of an assembly formed by the load beam portion, the flexure portion, and the balance mass member, and a load bending center line of the first and second extending portions along the widthwise direction of the suspension, and the length La being a length in the longitudinal direction of the suspension between the load bending center line and the center of gravity of a tip-end side portion of the assembly which is closer to the tip-end side of the suspension than the load bending center line.

9. The magnetic head suspension according to claim 2, wherein a length Lg and a length La has a relationship of $0.1 \leqq Lg \leqq 0.3 \times La$, the length Lg being a length in the longitudinal direction of the magnetic head suspension between a center of gravity of an assembly formed by the load beam portion, the flexure portion, and the balance mass member, and a load bending center line of the first and second extending portions along the widthwise direction of the suspension, and the length La being a length in the longitudinal direction of the suspension between the load bending center line and the center of gravity of a tip-end side portion of the assembly which is closer to the tip-end side of the suspension than the load bending center line.

10. The magnetic head suspension according to claim 7, wherein a length Lg and a length La has a relationship of $0.1 \leqq Lg \leqq 0.3 \times La$, the length Lg being a length in the longitudinal direction of the magnetic head suspension between a center of gravity of an assembly formed by the load beam portion, the flexure portion, and the balance mass member, and a load bending center line of the first and second extending portions along the widthwise direction of the suspension, and the length La being a length in the longitudinal direction of the suspension between the load bending center line and the center of gravity of a tip-end side portion of the assembly which is closer to the tip-end side of the suspension than the load bending center line.

* * * * *